(12) United States Patent
Severo et al.

(10) Patent No.: US 11,929,778 B2
(45) Date of Patent: Mar. 12, 2024

(54) ARTIFACT FREE CHAOTIC SPREAD SPECTRUM COMMUNICATION

(71) Applicant: Spectric Labs, Inc., Fairfax, VA (US)

(72) Inventors: Marc Severo, Centreville, VA (US); Anuj Junankar, Ashburn, VA (US)

(73) Assignee: Spectric Labs, Inc., Fairfax, VA (US)

( * ) Notice: Subject to any disclaimer, the term of this patent is extended or adjusted under 35 U.S.C. 154(b) by 0 days.

(21) Appl. No.: 17/750,913

(22) Filed: May 23, 2022

(65) Prior Publication Data

US 2023/0378998 A1    Nov. 23, 2023

(51) Int. Cl.
| H04B 1/709 | (2011.01) |
| H04B 1/707 | (2011.01) |
| H04B 1/7093 | (2011.01) |
| H04B 1/7176 | (2011.01) |

(52) U.S. Cl.
CPC ............ *H04B 1/709* (2013.01); *H04B 1/707* (2013.01); *H04B 1/7093* (2013.01); *H04B 1/7176* (2013.01)

(58) Field of Classification Search
CPC ...... H04B 1/707; H04B 1/709; H04B 1/7093; H04B 1/71635; H04B 1/71637; H04B 1/7172; H04B 1/7176; H04B 1/7183; H04L 25/03834; H04L 25/03866
USPC ................ 375/141–143, 146, 147, 150, 152; 370/349, 350
See application file for complete search history.

(56) References Cited

U.S. PATENT DOCUMENTS

| 2003/0007638 | A1 | 1/2003 | Carroll |
| 2004/0177310 | A1 | 9/2004 | Mohan et al. |
| 2005/0135314 | A1* | 6/2005 | Giannakis ......... H04L 25/03012 370/335 |
| 2011/0019719 | A1 | 1/2011 | Michaels et al. |
| 2013/0244642 | A1* | 9/2013 | Bouvier Des Noes ...................... H04B 15/00 455/422.1 |
| 2019/0190638 | A1 | 6/2019 | Swarup |

FOREIGN PATENT DOCUMENTS

KR    20140101269 A    *    8/2014

* cited by examiner

*Primary Examiner* — Young T. Tse
(74) *Attorney, Agent, or Firm* — Michael P. Fortkort; Protorae Law PLLC

(57) ABSTRACT

A method for transmitting covertly employs three features in a novel combination to create a transmission waveform that has no detectable artifacts. First, the method employs spread spectrum, such as a direct sequence spread spectrum signal, to transmit the power level below the noise floor. Second, the method modulates the phase of each chip in the spread spectrum signal using a chaotic sequence. Third, the method filters the transmission signal using a pulse shaped filter to depress blind detection features in the amplitude modulation and higher order power spectral densities. The novel combination of these features results in a practically invisible and undetectable transmission waveform. Many other features are disclosed herein to optimize this combination.

26 Claims, 55 Drawing Sheets

Burst Structure

ARTIFACT FREE CHAOTIC SPREAD SPECTRUM COMMUNICATION

STATEMENT REGARDING FEDERALLY-SPONSORED RESEARCH OR DEVELOPMENT

The present invention was developed at least partially with U.S. government support, and as such the government may have certain rights in one or more of the inventions included herein.

BACKGROUND

The present invention relates generally to communications systems, and more particularly to spread spectrum communications systems.

U.S. Patent Application Publication No. 2019/0190638 A1 by Swamp discloses a communications system using chaotic signals that replace a binary spreading codes used in spread-spectrum techniques.

U.S. Patent Application Publication No. 2011/0019719 A1 by Michaels et al. discloses a communications system generating a chaotic spreading sequence based on a chaotic number sequence.

U.S. Patent Application Publication No. 2004/0177310 A1 by Mohan et al. discloses a secure, synchronized communication system using chaotic frequency modulation.

U.S. Patent Application Publication No. 2003/0007638 A1 by Carroll discloses a low interference communications system using chaotic signals.

These prior art systems all suffer from the fact that there remain artifacts in the waveforms that can be used to detect the signal being transmitted.

The present invention is directed to the problem of developing a robust covert communication system that contains no detectable artifacts in the transmitted waveform.

SUMMARY OF THE INVENTION

The present invention solves these and other problems by providing a method for transmitting covertly that employs at least three features in a novel combination to create a transmission waveform that has no detectable artifacts. First, an exemplary embodiment of the method employs spread spectrum, such as a direct sequence spread spectrum signal, to spread the transmitted power level below the noise floor. Second, the exemplary embodiment of the method modulates the phase chips in the spread spectrum signal using a chaotic sequence. Third, the exemplary embodiment of the method filters a signal to be transmitted using a pulse shaped filter to suppress blind detection features in amplitude modulation and higher order power spectral densities. The novel combination of these features results in a practically invisible and undetectable transmission waveform. Many other features are disclosed herein to more fully optimize this novel combination.

In the above method, any phase shift keyed modulation may be used, e.g., QPSK, 8-PSK, 16-PSK, 256 PSK and M-ary PSK. Moreover, M-ary quadrature amplitude modulation (QAM) may be used. Frequency shift keyed modulation may also be used.

According to another aspect of the present invention, an apparatus for communicating comprises a transmitter and a receiver that employ the above described method.

According to yet another aspect of the present invention, an apparatus for communicating comprises a forward error correction coder, a burst multiplexer, a symbol mapper, a long pseudorandom generator, a spreader, a chaotic phase generator, a chaotic scrambler and a pulse shaped filter. Other elements may be provided in this apparatus without departing from the scope of the present invention.

The forward error correction coder is designed to receive data bits and to output encoded data using a predetermined forward error correction code, such as, for example, a turbo code. Other forward error correction codes could be used without departing from the scope of the present invention.

The burst multiplexer is coupled to the forward error correction coder, receives encoded bits and generates a fixed duration burst of symbols. A variety of burst lengths, number of symbols and symbol rates could be used without departing from the scope of the present invention.

In the burst multiplexer, the encoded data bits, e.g., payload bits and control/header bits are assembled into the burst packet. The burst multiplexer adds acquisition, synchronization and pilot sections. For example, the acquisition section may comprise a pseudo-noise sequence, that is used for signal acquisition. The receiver then uses this acquisition sequence to detect the presence of the burst and to perform coarse frequency offset estimation. The entire acquisition sequence can also be used to perform timing and frequency estimation. The structure and duration of the acquisition period supports detection in various degraded environments and operates with greater signal-to-noise ratio margin than the demodulator. The synchronization field may immediately follow the acquisition field. The synchronization field may consist of a unique and non-repeating sequence, which allows the receiver to correctly locate the beginning of the payload section. The implementation and size of the synchronization field may be revised or combined with the acquisition field based on hardware resources. After the synchronization field, data and pilots may follow. The data can be split up into segments with a pilot segment preceding and following each data segment. The first data segment may be the control/header information. The next data segments may be payload data. Pilot sequences are positioned before and after each section containing data such that the channel may be estimated before and after each segment, and are interpolated in-between.

The symbol mapper receives the fixed duration burst symbols from the burst multiplexer and generates mapped symbols by mapping the received symbols into mapped symbols, such as phase shifted keyed mapped symbols. Other forms of modulation, such as 8-PSK or higher order PSK (e.g., M-ary PSK) and including M-ary QAM, could be employed without departing from the scope of the present invention.

The long pseudorandom generator generates a pseudorandom sequence. Using the same PN sequence, radios may use a different initial condition to generate many non-overlapping PN sequences.

The spreader receives the pseudorandom sequence from the long pseudorandom sequence generator, receives the mapped symbols from the symbol mapper, and generates a spread spectrum signal with a plurality of chips from the pseudorandom sequence and the mapped symbols.

The chaotic phase generator generates chaotic phase shifts using, for example, a tent logistical map to generate a non-repeating floating-point sequence, which is then rounded and converted to an integer number of phase shifts.

The chaotic scrambler receives the spread spectrum signal from the spreader, receives the chaotic phase shifts from the chaotic phase generator, and generates a chaotic phase shifted spread spectrum signal by sequentially applying the chaotic phase shifts to each of the chips.

The pulse shape filter receives the chaotic phase shifted spread spectrum signal and filters the chaotic phase shifted spread spectrum signal to reduce one or more spectral analysis features in the chaotic phase shifted spread spectrum signal. An example of the pulse shape filter comprises a custom root-Nyquist filter that is optimized to reduce spectral analysis features.

In the above apparatus, an additional forward error correction coder may be used to receive meta data bits with information required by a receiver to detect, de-spread and decode the chaotic phase shifted spread spectrum signal and to output encoded meta data bits.

In the above apparatus, the long pseudorandom generator may be used to generate a common pseudorandom sequence to be shared by several receivers.

In the above apparatus, the burst multiplexer may have an additional input coupled to the additional forward error correction coder to receive the encoded meta data bits, which are then included in the burst signal.

In the above apparatus, the chaotic phase generator may employ a tent logistical map to generate the plurality of chaotic phase shifts.

In the above apparatus, the tent logistical map may be defined as $$x_{n+1} = \begin{cases} \mu x_n, & \text{for } x < \frac{1}{2} \\ \mu(1-x_n), & \text{for } x \geq \frac{1}{2} \end{cases}$$

where μ is a parameter between 0 and 2.

In the above apparatus, a chaotic tent map sequence may be mapped to a discrete phase scrambling sequence that is constant envelope, and a chaotic tent map sequence may be mapped to phase rotation values.

In the above apparatus, the pulse shape filter may be optimized to reduce any amplitude modulation or frequency modulation spectral features in the chaotic phase shifted spread spectrum signal.

In the above apparatus, the pulse shape filter may be optimized by a sequential quadratic programming algorithm, wherein a non-linear solver is set up to be constrained on attributes that define a root-Nyquist filter, including passband and stopband regions, and favorable inter-symbol interference measurements when accompanied by a matched filter. The pulse shape filter may be further optimized by providing the non-linear solver an objective function to minimize an amplitude modulated demodulation spectral rate line to create an asymmetrical root Nyquist filter.

In the above apparatus, pilot sequences may be interspersed throughout the fixed duration burst and spaced in such a way that a receiver can properly equalize a received signal in a multipath environment by estimating and compensating for the channel multiple times during a demodulation process.

In the above apparatus, a receiver may be used that extracts the plurality of pilot sequences for channel estimation by using successive pilot sequences and interpolates and estimates a channel for inner symbols.

In the above apparatus, a receiver may be used to receive a baseband signal. The receiver includes a matched filter that matches the pulse shape filter to match filter the baseband signal and a detector coupled to the match filter to detect a received burst in the baseband signal and establish timing. In the receiver, the matched filter is time reversed relative to the pulse shape filter used in transmission, but which otherwise matches a shape of the pulse shape filter used in transmission.

In the above apparatus, the detector may generate an acquisition sequence by combining the chaotic phase shifts with the long pseudorandom sequence and then using the acquisition sequence as a correlation template to detect the burst and establish timing.

In the above apparatus, the receiver may include a de-chaoser coupled to the detector to receive the acquisition sequence, output a de-chaosed signal, and have a feedback input to receive a frequency offset. The receiver may also include a de-spreader coupled to the de-chaoser, in which the de-spreader outputs de-spread symbols. The receiver may also include a coarse frequency estimator coupled to the de-spreader, which provides a coarse frequency offset to the de-chaoser via a feedback input of the de-chaoser, wherein the coarse frequency estimator estimates a frequency offset by looking at a spectral component of a signal after raising to a $4^{th}$ power and the de-chaoser uses the coarse frequency offset for frequency correction. The receiver may also include a burst demultiplexer having coupled to the de-spreader, a fine frequency corrector coupled to the burst demultiplexer, and a phase corrector coupled to the fine frequency corrector, wherein pilots embedded in the received burst are used as matched filters to ensure proper timing of a payload due to potential sample slips associated with clock drifts, and each payload block is equalized independently using a preceding pilot symbol and a trailing pilot symbol. The receiver may also include a demodulator to receive symbols output from the phase corrector, which demodulator demodulates the symbols output from the phase corrector, wherein the demodulator outputs soft decision bits. The receiver may also include an error correction decoder coupled to the demodulator, and error correcting the soft decision bits using the predetermined forward error correction code. The receiver may also include a cyclic redundancy check decoder coupled to the error correction decoder, which cyclic redundancy check decoders verifies error corrected data bits for errors before outputting the data bits.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION

The present invention comprises a low data-rate, featureless low probability of intercept/low probability of detection (LPFLPD) waveform. The transceiver of the present invention is termed SPECTRIC_WF21A herein.

The entire transceiver chain of the present invention has been successfully simulated, including channel and hardware impairments to emulate real-world conditions. The simulation took advantage of common channel fading models for rural, hilly, and urban environments based on the 3rd Generation Partnership Project (3GPP) consortium. Simulations show that a waveform of the present invention is successfully detected and demodulated by the receiver of the present invention even when degraded with channel and hardware impairments.

The waveform of the present invention exhibits noise-like characteristics at low-SNR and is resilient against cyclostationary detection techniques even at high-SNR. In addition, the waveform of the present invention was designed to be resilient against many other techniques used for both blind and directed signal detection. Directed signal detection techniques assume knowledge of waveform parameters, such as chip rate, baud rate, or carrier frequency. The characteristics of the waveform of the present invention have been thoroughly evaluated in a near noise-less (i.e., high-SNR) environment to objectively evaluate the strengths and weaknesses of the waveform design in a worst-case scenario. The testing shows that the waveform of the present invention is indistinguishable from noise at real-world operating signal-to-noise ratios (SNRs).

Software Simulation of SPECTRIC_WF21A Waveform

Figure 1:
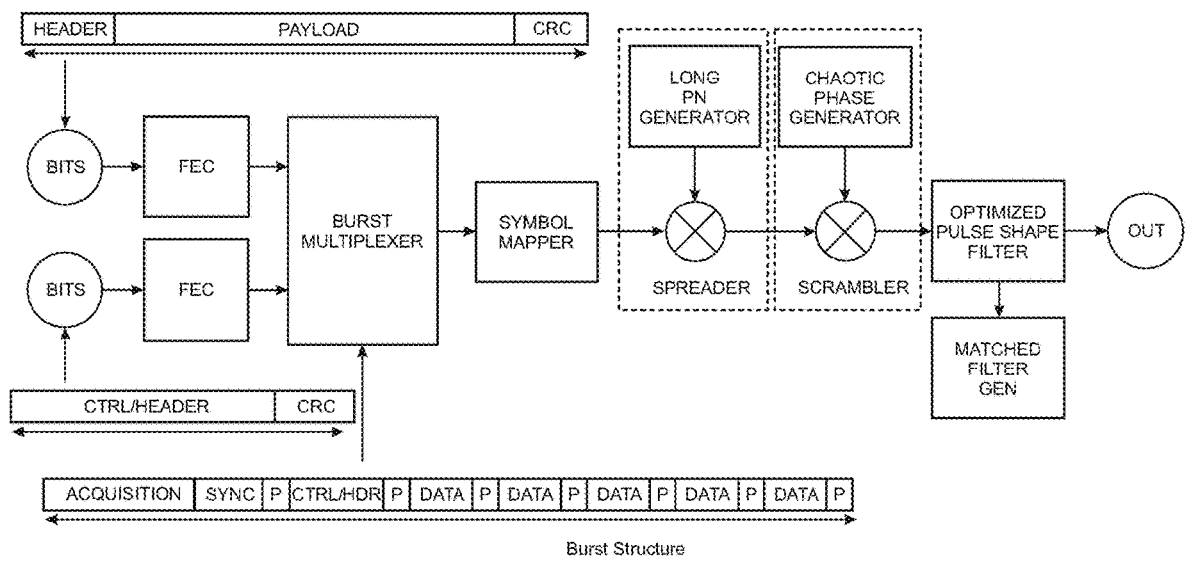
FIG. 1 depicts a block diagram of an exemplary embodiment of a burst transmitter according to one aspect of the present invention.

An exemplary embodiment of a transmitter block diagram of the present invention is shown in FIG. 1, which shows the Waveform Transmit Chain of the present invention.

Additionally, the exemplary embodiment of the transmitter of the present invention can support other symbol rates, spreading factors, forward-error-correction (FEC) methods, payload sizes, and burst durations.

Description of Exemplary Embodiment of a Packet

One exemplary embodiment of a waveform packet of the present invention consists of two data fields: a CTRL/HEADER section and a PAYLOAD section. The PAYLOAD and CTRL/HEADER data are generated and encoded independently allowing the CONTROL data to be sent either with or without a PAYLOAD section.

The Forward Error Correction (FEC) code selected for the exemplary embodiment of the present invention is a turbo code. Other FEC codes could be used without departing from the scope of the present invention.

After FEC encoding, the encoded PAYLOAD and CTRL/HEADER are assembled into an exemplary embodiment of a burst, termed an SPECTRIC_WF21A burst according to an aspect of the present invention. The burst multiplexer adds the ACQUISITION, SYNC, and PILOT sections. The ACQUISITION section comprises a pseudo-noise sequence that is used for signal acquisition. The receiver uses this ACQUISITION sequence to detect the presence of an SPECTRIC_WF21A burst and to perform coarse frequency offset estimation. The first symbols of the ACQUISITION section form a sequence that is used in initial signal detection. The entire ACQUISITION sequence is then used to perform timing and frequency estimation.

The SYNC field immediately follows the ACQUISITION field. The SYNC field consists of a unique and non-repeating sequence which allows the receiver to correctly locate the beginning of the payload section. The implementation and size of the SYNC field may be revised or combined with the ACQUISITION based on hardware resources without departing from the scope of the present invention.

After the SYNC field, data and pilots follow. The data is split up into segments with a PILOT segment preceding and following each data segment. The first data segment is the CTRL/HEADER information. The next data segments are PAYLOAD data. PILOT sequences are positioned before and after each section containing data such that the channel may be estimated before and after each segment, and are interpolated in-between.

After the burst multiplexer, the SPECTRIC_WF21A packet is mapped into PSK symbols before beginning the spreading operation. The spreading operation performs long-code pseudo-noise PN spreading such that the PN sequence does not repeat within a transmission. Using the same PN sequence, radios may use a different initial condition to generate many non-overlapping PN sequence.

The chaotic scrambler of the present invention follows the long-PN spreader. The chaotic sequence is defined using a Tent logistical map to generate a non-repeating floating-point sequence. The sequence is then rounded and converted to the phase shifts which is applied to each chip. The number of phase shifts permitted is flexible, however limiting the number of phase shifts helps control the complexity in receiver implementation. The rounding operation also provides a more uniform sequence which helps maintain the flat spectral properties exhibited by the waveform of the present invention.

After the chaotic scrambling operation follows the upsample and pulse shape filtering operation, prior to RF transmission. The filter selected is a custom root-Nyquist filter which is optimized to reduce spectral analysis features. The inclusion of the custom-root-Nyquist filter was added to provide resiliency against certain LPI/LPD detection techniques.

ACQUISITION and SYNC

Two radios that communicate with one another must first acquire the signal by locking onto the ACQUISITION and SYNC sequences. Each radio will have its own unique spreading sequence by selecting a unique phase (i.e., subset) of the long, non-repeating spreading sequence defined below. The radios will have no knowledge about any of the other radios spreading sequences. During this connection establishment stage the radios will exchange metadata such that the radios can detect, de-spread and decode each other's transmissions.

The specifics of the metadata transferred during the connection establishment stage are tied to an implementation detail of the Linear feedback shift registers (LFSRs). LFSRs are extremely efficient ways to generate long, non-repeating sequences. LFSRs are recursive sequences where new bits are generated from old bits using binary addition (i.e., modulo 2). The generated pseudorandom pattern is based on the polynomial, which provides the shift register taps, and the initial fill of the shift register. Knowing the polynomial and initial fill is all that is required for two radios to synthesize the spreading sequences for acquisition. Exchanging the spreading sequence information in this manner provides flexibility where new radios may join or leave a network with minimal pre-mission configuration.

The control channel will require a common spreading sequence that is shared by all radios in the network. Each radio will use the shared spreading sequence for transmission on the control channel. The control channel spreading sequence can be reconfigured to support logically distinct networks or to mitigate risks of detection during successive burst transmission operations where an adversary may have identified the control channel.

Exemplary Embodiment of a Chaotic Scrambler Design

An exemplary embodiment of a chaotic scrambler is generated using a Tent logistical map defined as:

$$x_{n+1} = \begin{cases} \mu x_n, & \text{for } x < \frac{1}{2} \\ \mu(1-x_n), & \text{for } x \geq \frac{1}{2} \end{cases}$$

where μ is a parameter between 0 and 2. The above system is considered chaotic as the sequence is deterministic, infinite, non-repeating, and highly sensitive to parameter and initial conditions. These are favorable qualities for LPD and LPI waveforms. Reverse engineering a chaotic sequence is extremely challenging as even a small amount of erroring estimation, even in high SNR environments, will fail to identify the sequence. Further, the sensitive nature of chaotic sequences allows for a large number of unique sequences be generated. For the exemplary embodiment of the transmitter of the present invention, each radio will transmit on the data channels using a unique chaotic sequence.

As the chaotic sequence is highly sensitive to parameters and states, care must be taken to ensure each system can exactly reproduce the desired sequence. The very small errors that are a result of a processors double-precision math are sufficient to cause divergence of a chaotic sequence.

Figure 2:
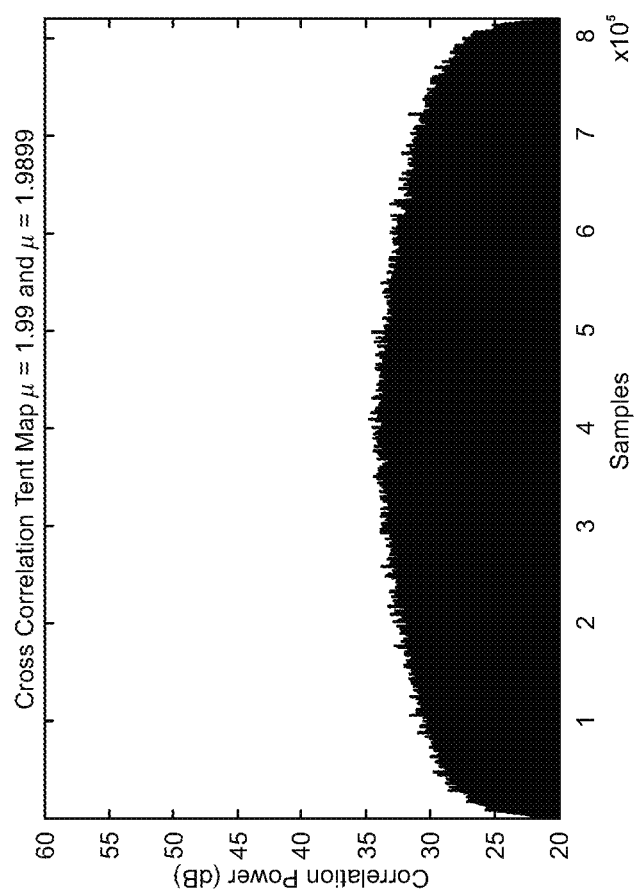
FIG. 2 depicts a plot demonstrating a sensitive nature of a chaotic sequence used in an exemplary embodiment of the present invention by showing a cross correlation of two chaotic sequences with the same initial condition and μ just 0.0001 apart.

To demonstrate the sensitive nature of a chaotic sequence, FIG. 2 shows the cross correlation of two chaotic sequences with the same initial condition and μ just 0.0001 apart. The cross correlation shows that the two sequences diverge and are unique. Since each radio will have its own chaotic scrambling sequence, each radio will be uncorrelated from each other. The sensitivity to initial conditions is an extremely important feature of chaos sequences because the waveform cannot be matched filtered for detection or demodulated without near-perfect recreation of the original sequence.

Figure 3:
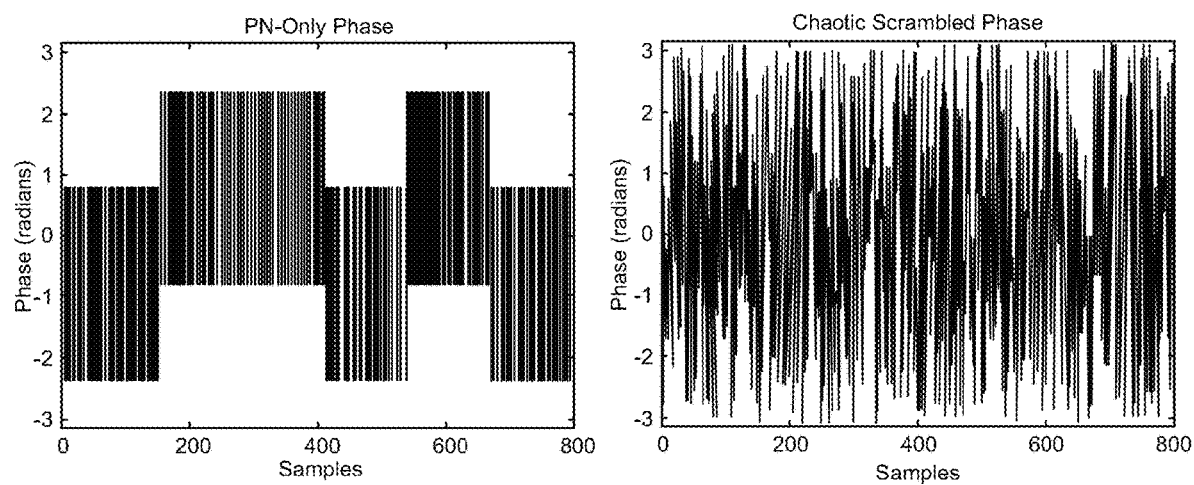
FIG. 3 depicts a plot of the number of samples versus phase showing an example of the phase of the chaotic sequence used in an exemplary embodiment of the present invention compared to the phase of a PN-Only sequence.

In the exemplary embodiment of the transmitter of the present invention, the chaotic Tent Map sequence is mapped to a discrete phase scrambling sequence that is constant envelope. The sequence is mapped to one of the phase rotation values. The translation between real-value chaos sequence to discrete phase scrambling performs a few different functions. For one, it reduces complexity in the radio hardware by allowing the sequence to utilize a look-up table for scrambling. Second, it adds abstraction to the scrambling sequence to provide additional LPI quality. FIG. 3 is an example of the phase of the chaotic sequence compared to the phase of a PN-Only sequence.

Figure 4:
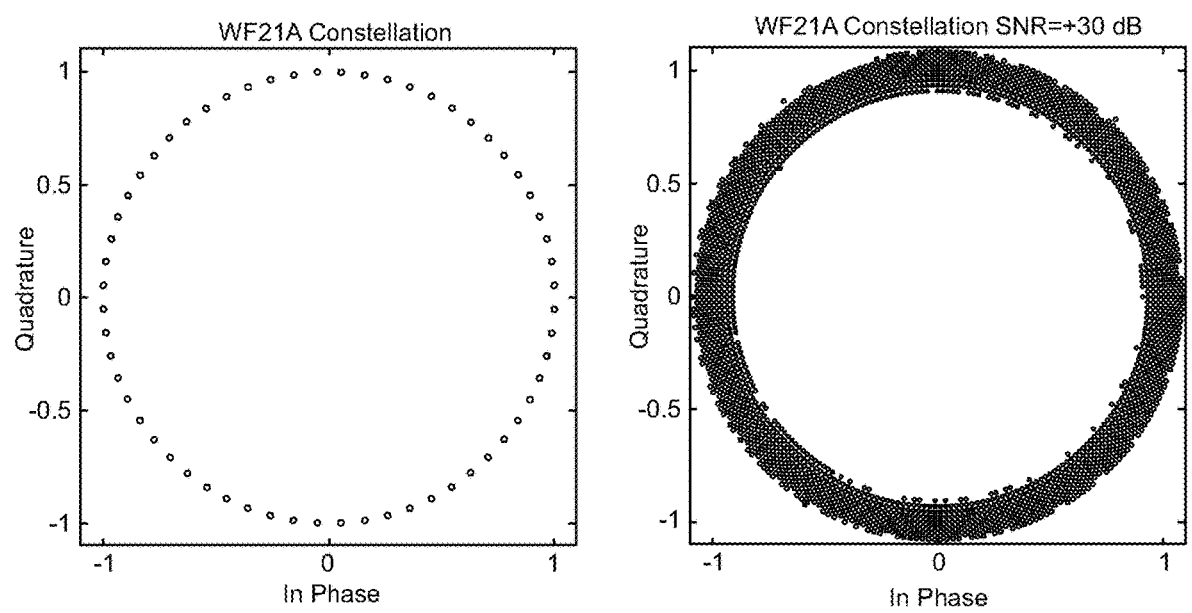
FIG. 4 depicts a plot showing how the chaotic sequence used in an exemplary embodiment of the present invention manipulates the observed constellation of the waveform of the present invention according to still another aspect of the present invention.

Additionally, the chaotic sequence manipulates the observed constellation of the waveform of the exemplary embodiment of the transmitter of the present invention, as seen in FIG. 4. Under an ideal and noiseless channel, the waveform of the present invention does not appear as QPSK but rather as a high-order N-PSK constellation. Under an Additive White Gaussian Noise (AWGN) channel with perfect timing, matched filter, and high Signal-to-Noise Ratio (SNR), the constellation is not distinguishable as evident from FIG. 4. This constellation is irregular and not common. Many blind demodulation methods would interpret this constellation as a frequency offset and force a lower order PSK modulation, which would only add distortion. This is another way that the exemplary embodiment of the waveform of the present invention provides low probability of intercept (LPI).

The present invention includes a pulse shape filter that can be manipulated to reduce any spectral features inadvertently present in the waveform that can be detected by AM or FM demodulators. According to one aspect of the present invention, the waveform can be modified to utilize an optimized pulse shape filter to minimize any AM & FM demodulation spectral features that might be present.

Figure 5:
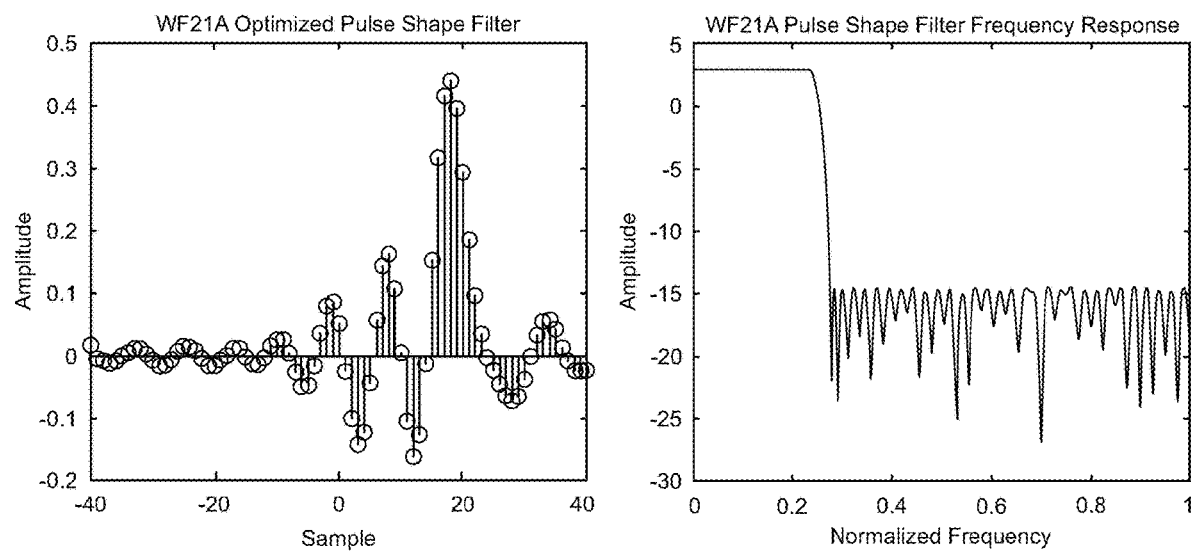
FIG. 5 depicts an exemplary embodiment of a custom pulse shape filter of the present invention along with the filter's frequency response according to another aspect of the present invention.

To generate an optimal filter, the exemplary embodiment of the present invention uses a sequential quadratic programming algorithm. The non-linear solver is set up to be constrained on attributes that define a root-Nyquist filter, such as passband and stopband regions, and favorable inter-symbol interference measurements when accompanied by its matched filter. With the constraints of the non-linear solver defined, the solver is provided an objective function to minimize the AM demodulation spectral rate line. The resulting filter is an asymmetrical root Nyquist filter. FIG. 5 shows the custom pulse shape filter and the filter's frequency response of an exemplary embodiment of a pulse shape filter for use in the transmitter of the present invention.

Figure 6:
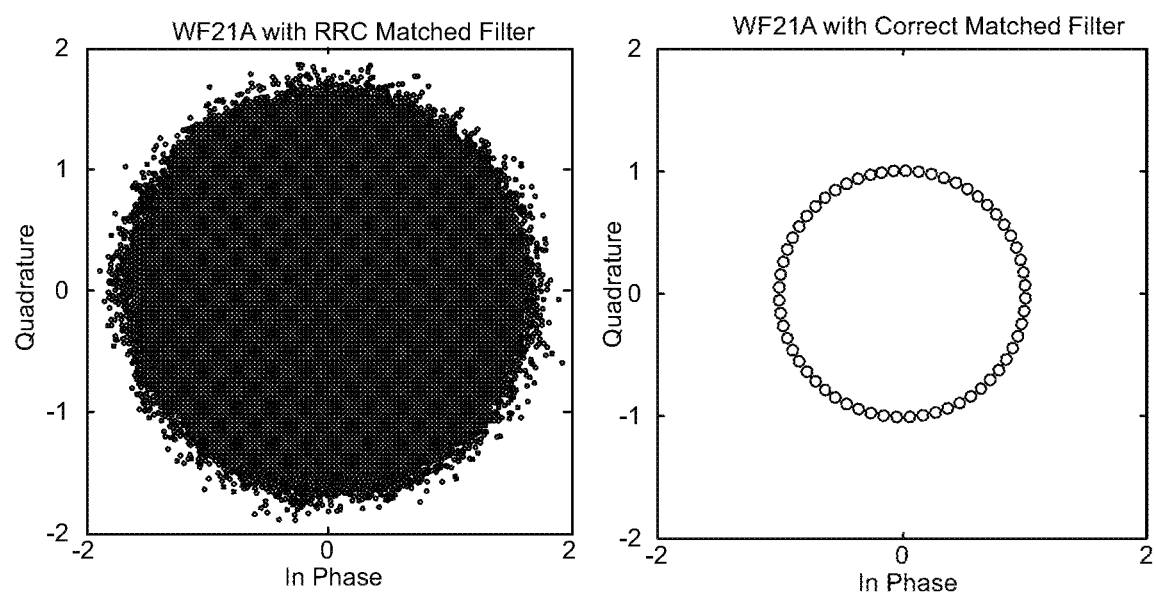
FIG. 6 depicts certain benefits for LPI of the asymmetrical filter of the present invention, for example, if an observer assumes a typical root-raised-cosine filter, the resulting matched filter results in significant ISI as opposed to using the correct matched filter as shown in this figure, according to yet another aspect of the present invention.

The asymmetrical filter provides additional benefits for LPI. If an observer assumes a typical root-raised-cosine filter, the resulting matched filter results in significant inter-symbol interference (ISI), as shown in FIG. 6. However, ISI is minimal for receivers of the present invention that know the correct matched filter, as evident from FIG. 6.

Channel and RF Impairments

Figure 7:
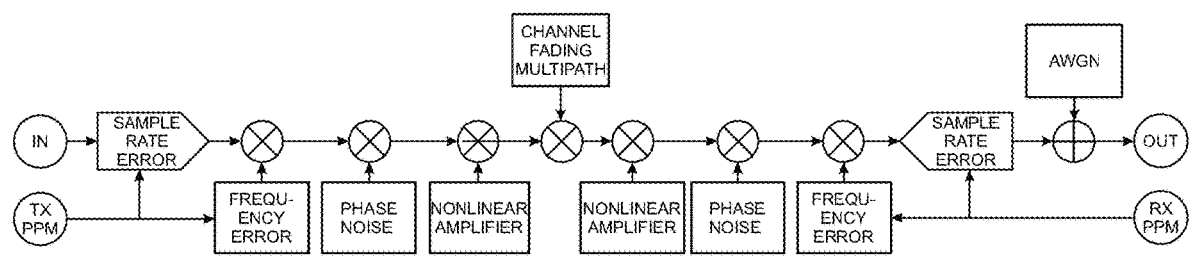
FIG. 7 depicts a block diagram of the simulation environment and channel impairments used in evaluating the present invention according to still another aspect of the present invention.

The waveform performance of the present invention has been rigorously evaluated through software to emulate real world environments and radio impairments. Radio impairments are artifacts and distortion that occur due to imperfections in hardware. It is important that demodulators are implemented to detect and correct for these impairments. Some examples critical to successful radio transmission are corrections to sample rate error and frequency offsets, which are a result of small errors in the radio oscillators. For sample rate and carrier frequency error, a +/−3 ppm clock error is assumed. Other impairments that exist are phase noise and amplifier nonlinearity distortion. A simulation of the exemplary embodiment of the present invention includes these impairments to validate and quantify receiver capabilities. Additionally, channel fading models are simulated to validate the equalization process used in the exemplary embodiment against environmental conditions such as multipath and movement of the transmitter versus receiver. FIG. 7 depicts the block diagram of the simulation environment used. FIG. 7 shows the Channel and RF Impairments Implemented in testing. IN is fed to a sample rate error. TX PPM is input to the sample rate error and frequency error. The output of the sample rate error is fed to three consecutive mixers, which add frequency error, phase noise and a non-linear amplifier. Channel Fading Multipath is then added via mixer after the first nonlinear amplifier. Next, three mixers add a second nonlinear amplifier, more phase noise and more frequency error. RX PPM is input to another sample rate error and the second frequency error. The output of the sample rate error is fed to a mixer to which is added AWGN and then output.

Figure 8:
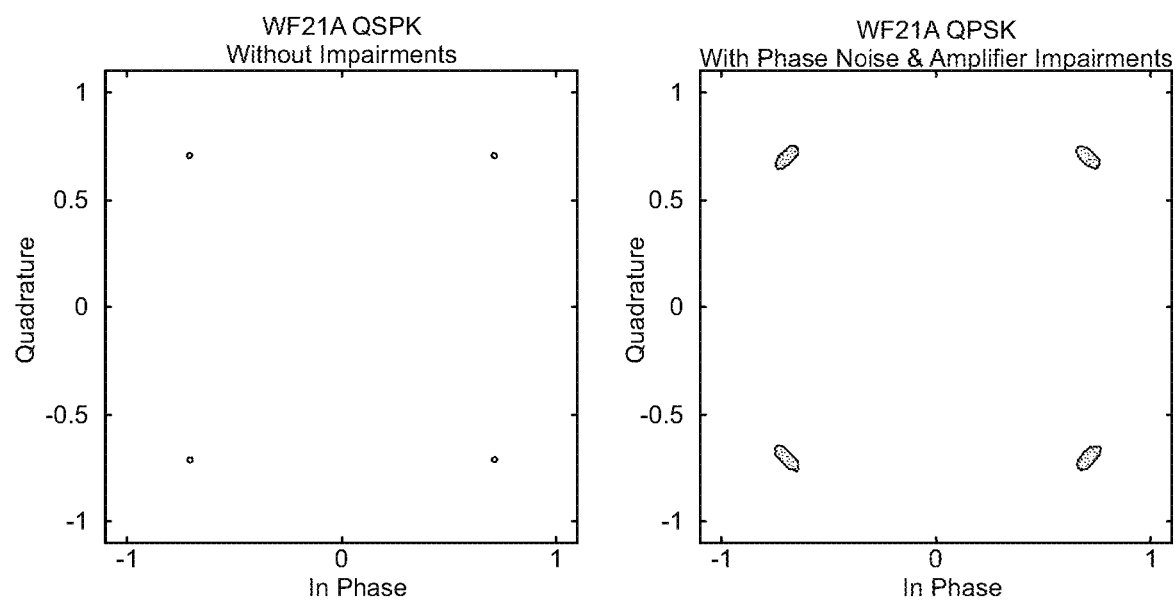
FIG. 8 depicts a combined expected phase noise and amplifier impairments of the exemplary embodiment of the present invention, which shows a minimal amount of distortion on the received symbols, according to still another aspect of the present invention.

Phase noise and amplifier nonlinearity impairments were also included in the simulation environment. These impairments can be minimized by quality radio components, but some amount of distortion is unavoidable. These impairments are difficult to correct in the demodulator and introduce a small amount of additional noise in the receiver beyond AWGN. It is therefore useful to simulate phase noise and nonlinear amplifier attributes when validating demodulator performance. FIG. 8 shows the combined expected phase noise and amplifier impairments which shows a minimal amount of distortion on the received symbols.

Channel effects are due to multipath and environmental scenarios. To test the exemplary embodiment, a range of environments were evaluated: ideal AWGN, rural terrain models, hilly terrain models, and urban terrain models. AWGN and rural terrain models are considered to be line-of-sight (LOS) using an ideal or Rician scattering model, while hilly terrain and urban areas are considered to be non-line-of-sight (NLOS) with Rayleigh scattering models.

Figure 9:
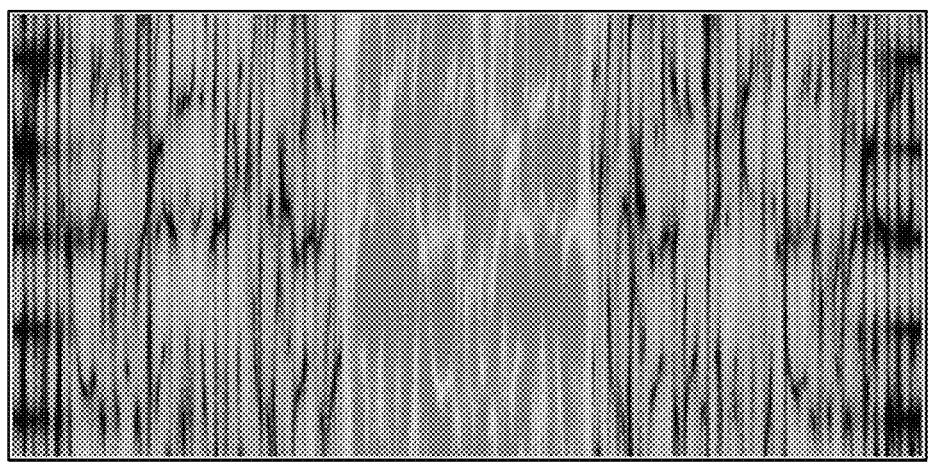
FIG. 9 depicts is a raster PSD plot of the waveform of the exemplary embodiment of the present invention over an urban channel with vehicular speeds at 50 MPH, according to still another aspect of the present invention.

The exemplary embodiment was tested against common channel fading models such as the GSM series of models for rural areas, hilly terrain, and urban areas, as defined in 3GPP TS 45.005 V7.9.0 (2007–2), 3GPP TS 05.05 V8.20.0 (2005–11). Additionally, the CDMA multipath models can be simulated, as defined in 3GPP TR 25.943 V6.0.0 (2004–12). The exemplary embodiment was tested against both pedestrian models which incorporate a slow fading channel model, where local nulls are persistent throughout transmission, and fast fading models for vehicular speeds at 50 MPH. While exemplary embodiment was tested across multiple models and scenarios, for conciseness, the primary models presented are the 50 MPH rural (GSM 6-tap) model for LOS, and 50 MPH urban terrain (GSM 12-tap) model for NLOS. FIG. 9 is a raster PSD plot of the exemplary embodiment's waveform over an urban channel with vehicular speeds at 50 MPH. Time is the y-axis, frequency is in the x-axis, and amplitude is indicated by shares of grey: dark grey for low power and light grey for high power. The effects of multipath environment are shown as time varying constructive and destructive interference. This is a doubly selective channel that is both time and frequency selective. Within the center band of transmission local nulls may be observed. Because of the time and frequency varying nature of the channel, the waveform must estimate and compensate for the channel multiple times during the demodulation process. The pilots that are interspersed throughout the burst (see FIG. 1) are spaced in such a way that the receiver of the present invention can properly equalize the signal in a multipath environment.

Channel Assumptions

The transmitter/receiver design of the present invention will support on-the-move communications at speeds up to 50 MPH. The spacing of the pilot sequences is dictated by the Doppler shift at the desired speed. The receiver will extract the PILOT sequences and use them to estimate the channel. Using two successive PILOT fields, the receiver interpolates and estimates the channel for inner symbols.

Receiver Design

Figure 10:
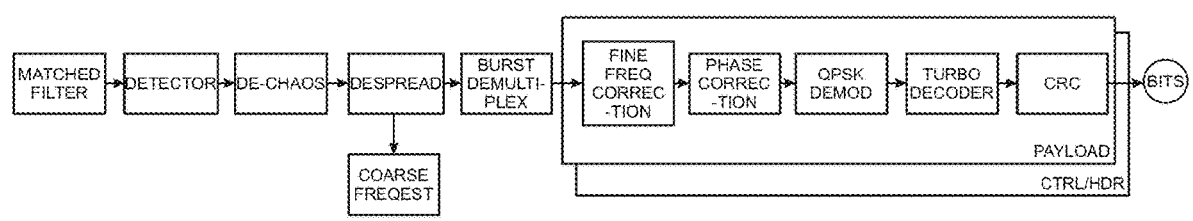
FIG. 10 depicts an exemplary embodiment of a receiver of the present invention, according to still another aspect of the present invention.

The receiver of the present invention is depicted in FIG. 10, which receiver was designed and simulated in software. As shown in FIG. 10, the receiver includes a matched filter followed by a detector, a de-chaoser, a despreader, a coarse frequency estimator, and a burst demultiplexer. The payload is further processed in the receiver by a fine frequency correction, phase correction, QPSK Demodulator, Turbo Decoder, and CRC to obtain the bits. CTRL/HDR process (not shown). The receiver ingests oversampled pre-demodulated complex baseband samples. The baseband signal is matched filtered with the time reversed custom pulse shape filter of the present invention. The acquisition sequence is generated by combining the chaotic phase scrambling sequence with the long PN sequence. The synthesized acquisition sequence is used as a correlation template to detect the burst and establish timing. Following acquisition, the burst is de-chaosed and de-spread. The de-spread symbols are sent into a coarse frequency estimator that estimates a frequency offset by looking at the spectral component of the signal after raising to the 4th power. The coarse frequency offset is fed back for frequency correction. After retuning the signal, the pilots are used as matched filters to ensure proper timing of the payload in the event of sample slips associated with the hardware clock drifts. Each payload block is equalized independently using the preceding and trailing pilot symbols. After equalization the symbols are QPSK demodulated. The output of the demodulator are soft decision bits that that are error corrected using a rate turbo decoder. The output bits are verified for errors using a CRC.

Figure 11:
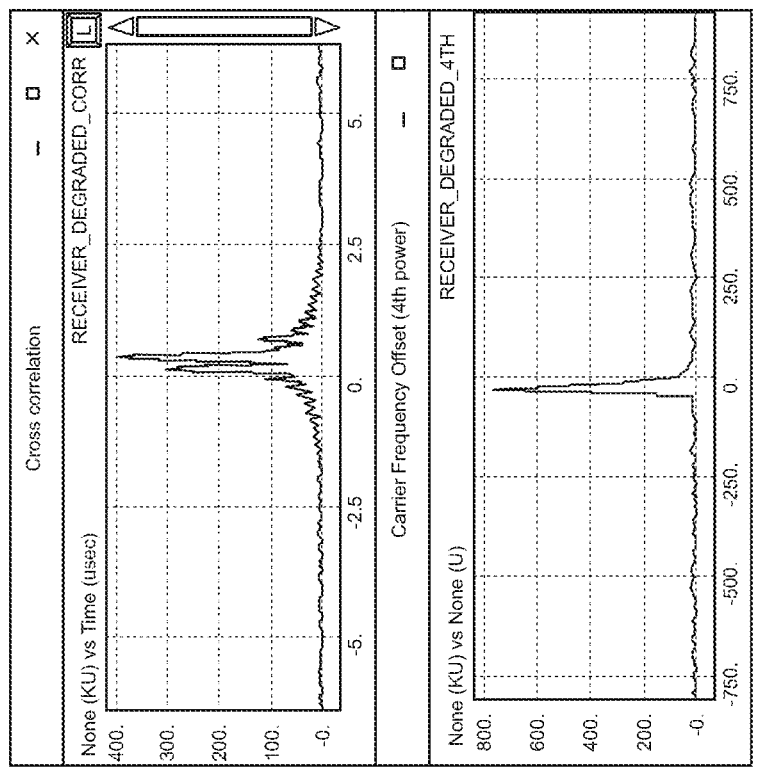
FIG. 11 shows example plots from a simulation of the exemplary embodiment of the receiver of the present invention, in which a Rician faded channel at −6.0 dB SNR is used.
Figure 11:
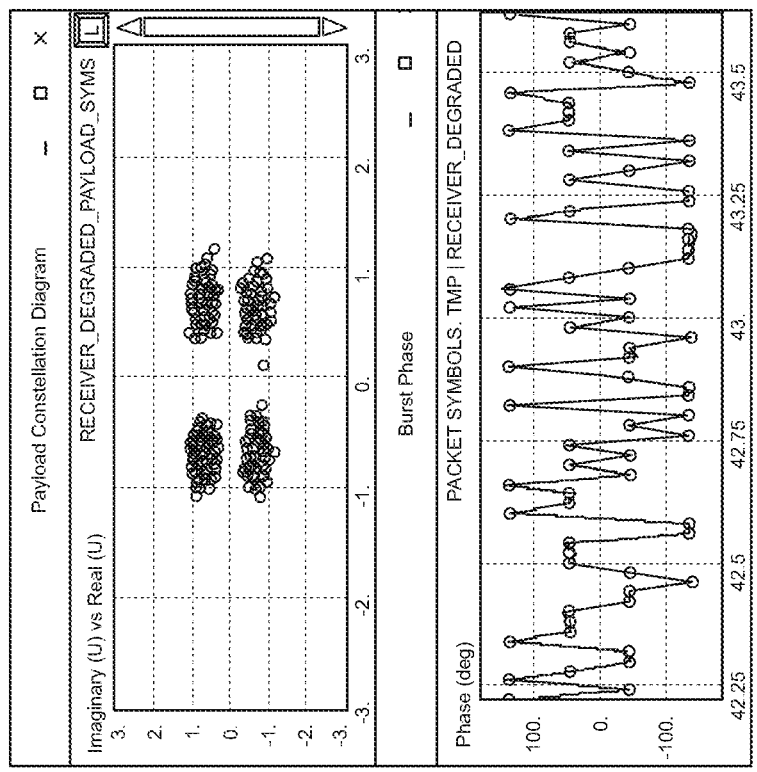

FIG. 11 shows example plots from the receiver simulation using a Rician faded channel at −6.0 dB SNR. The simulation also included transmitter and receiver impairments such as frequency error, phase error, and nonlinear amplifier distortion (see FIG. 7). The top left plot shows the output of the detector after cross correlation with the acquisition sequence. The top right plot is the coarse carrier frequency estimate. The bottom left plot shows the payload symbols after equalization, and the bottom right plot is the phase of the demodulated symbols (grey lines) of the SPECTRIC_WF21A burst plotted on top of the synthesized burst from the transmitter (lines with white circles). Direct overlap indicates near perfect demodulation of the signal at the receiver.

Evaluation of LPI/LPD Characteristics of Waveform

Approach

To demonstrate effectiveness of the transmitter waveform of the present invention as an LPI/LPD waveform a variety of blind and directed detection techniques were evaluated. While the primary concern is the use of blind techniques that do not require prior knowledge of the signal, it is informative to understand performance of popular directed search techniques where key signal parameters may be guessed, compromised, or solved through brute force. Detectable features for traditional DSSS and the exemplary embodiment of waveforms of the present invention were measured and analyzed using the search algorithms described in Table 1.

TABLE 1

Blind and Directed Search Algorithms Evaluated

| Blind and Directed Search Techniques | Purpose |
| --- | --- |
| High Order Power Spectral Destiny (PSD) | Observe features in the PSD of the signal squared ($2^{nd}$ Power) and raised to the $4^{th}$ power ($4^{th}$ Power). |
| Amplitude Demodulation (AM) and Frequency Demodulation (FM) | Observe features in PSD of the signal's AM and FM components. |
| Autocorrelation | Observe features indicating the presence of periodicity at fundamental and harmonic frequencies. |
| Cyclostationary - Strip Spectral Correlation Analyzer (SSCA) | SSCA creates a bi-frequency plane (cycle frequency vs. spectral frequency) output. The Cyclic Feature Function (CFF) is created through a dimensionality reduction technique that maintains second-order cyclostationary features. Observe features in the CFF related to cyclic frequencies and center frequency offset. |
| Cyclostationary Detection | Observe features in the cyclostationary spectrum calculated at a known symbol rate or chip rate. |
| Delay Multiply | Observe features in a Delay Conjugate Multiply (DCM) of the signal with delay equal to ½ of the known chip duration. |

Test Signals

The LPI/LPD analysis examined detectable features for a large signal set of traditional DSSS and signals of the transmitter of the present invention with a wide range of transmit parameters.

In this discussion, DSSS1 uses a "Textbook Code" where the same spreading sequence is used for each symbol. DSSS2 changes that to take the spreading sequence for each symbol from successive locations in a long non-repeating "max length" sequence, such that every symbol will be spread with a different code. DSSS3 also uses max length sequences but adds Chaotic Phase scrambling according to an aspect of the present invention. Finally, the signal of the present invention adds a custom pulse shape filter to further minimize detectable features. DSSS3 comprises a design for the waveform without custom pulse shape filtering according to one aspect of the present invention.

Results—Detectability at High SNRs

While the intention is to take advantage of the spread spectrum nature of the exemplary embodiment of the waveform to operate in the real world at transmit powers below the noise floor, it is informative to begin by examining detectable features for the exemplary embodiment of the waveform and traditional DSSS signals at high SNRs. Initial analysis will utilize values 10-30 dB greater than the intended operating range of −10 to −18 dB $E_c/N_0$. Starting with high SNRs exposes detectable features for all exemplary test signals and provides valuable context for further analysis and comparisons. SNR and $E_c/N_0$ are used interchangeably in the subsequent discussion to describe the relative signal power to noise power.

Blind Search at High SNRs

Figure 12:
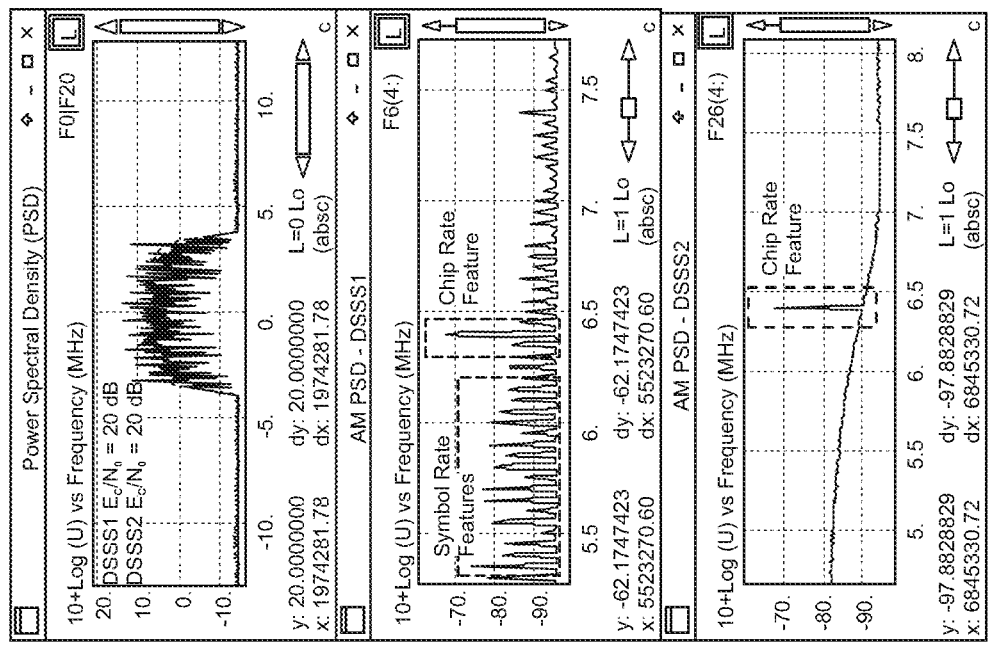
FIG. 12 depicts a plot that illustrates that both DSSS1 and DSSS2 yield detectable features at the chip rate in the AM, 2nd power, and 4th power PSDs.
Figure 12:
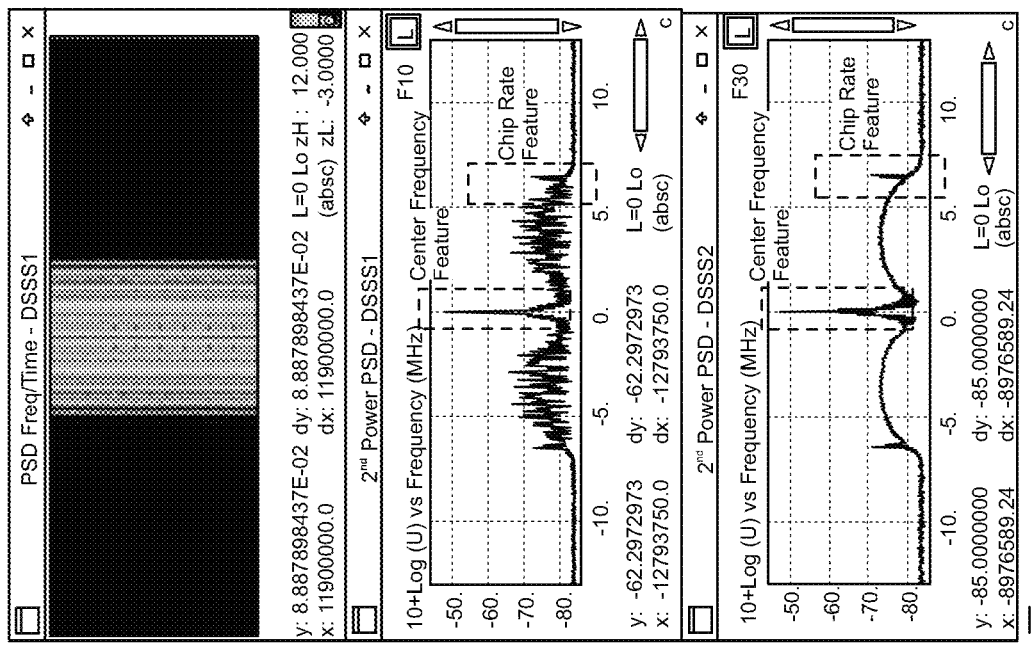
Figure 12:
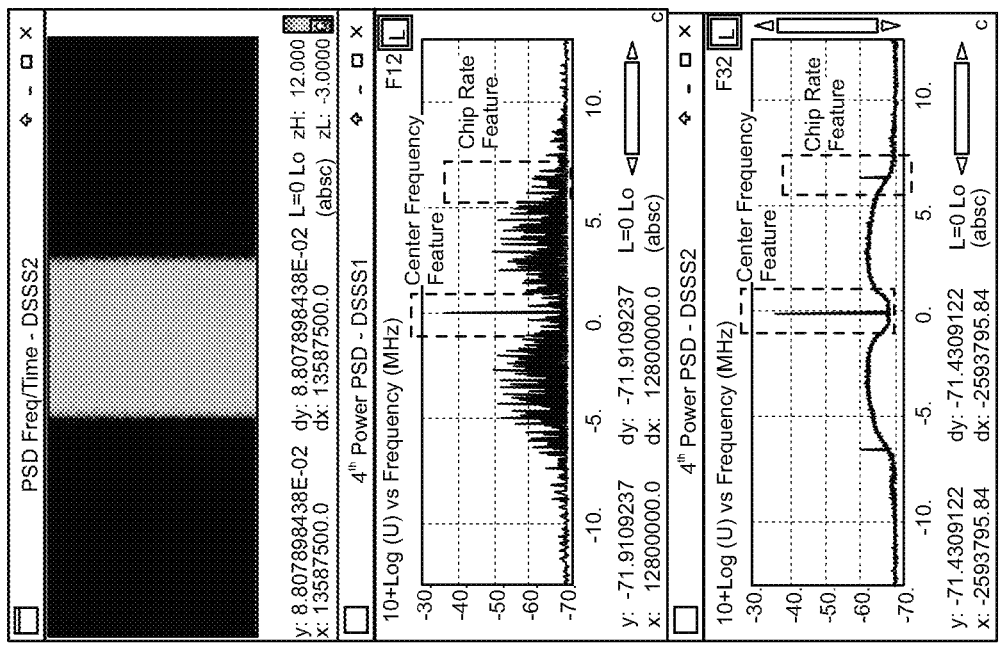

A common approach in blind signal detection is to search for features in the AM, FM, and Higher Order Power PSDs. Traditional DSSS signals are known to yield such features while the exemplary embodiment of the waveform was designed intentionally to suppress them. As illustrated in FIG. 12, both DSSS1 and DSSS2 yield features at the chip rate in the AM, $2^{nd}$ power, and $4^{th}$ power PSDs. Additionally, both signals display center frequency features in the $2^{nd}$ power, and $4^{th}$ power PSDs. The textbook codes in DSSS1 provides additional information about the underlying symbol rate through "picket fence" features with tones separated by the spreading factor. The use of max length codes in signal DSSS2 suppresses the symbol rate features but still provides a feature at the chip rate.

The FM PSD was not shown to provide significant information beyond what was shown in the AM PSD. For signals that were correctly center tuned, the FM PSD did not provide meaningful features. For off-tuned signals chip rate features did occasionally appear but were less pronounced than the same features in the AM PSD.

Figure 13:
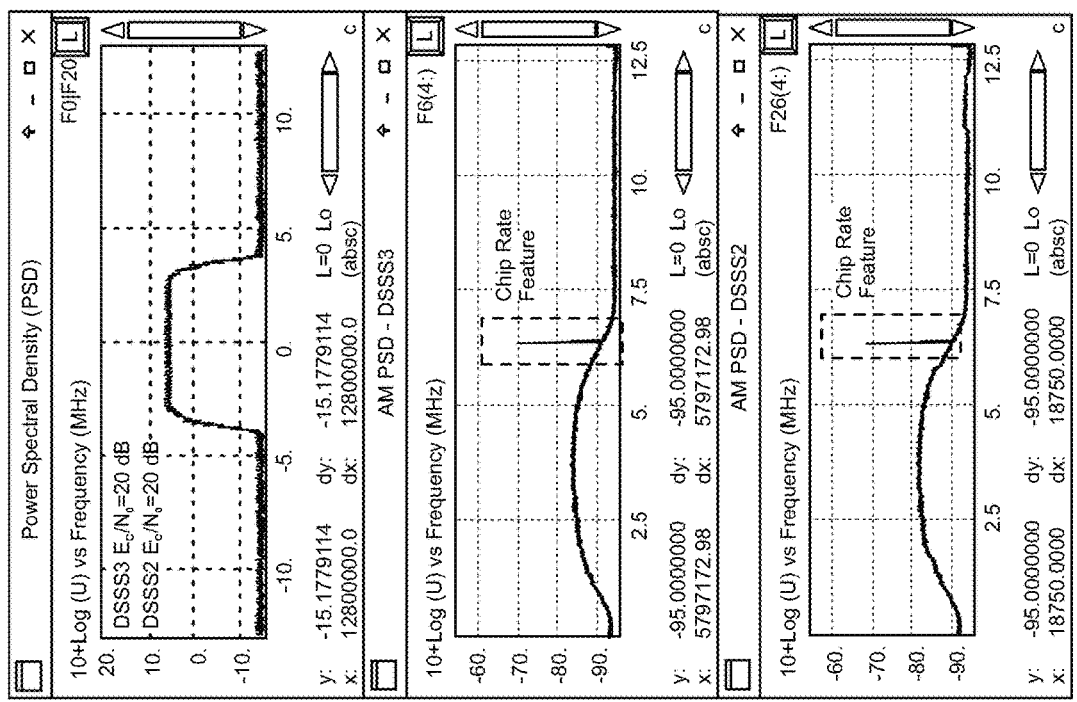
FIG. 13 depicts a plot that shows how introduction of chaos in DSSS3 suppresses features in higher order PSDs seen in DSSS2 according to yet another aspect of the present invention.
Figure 13:
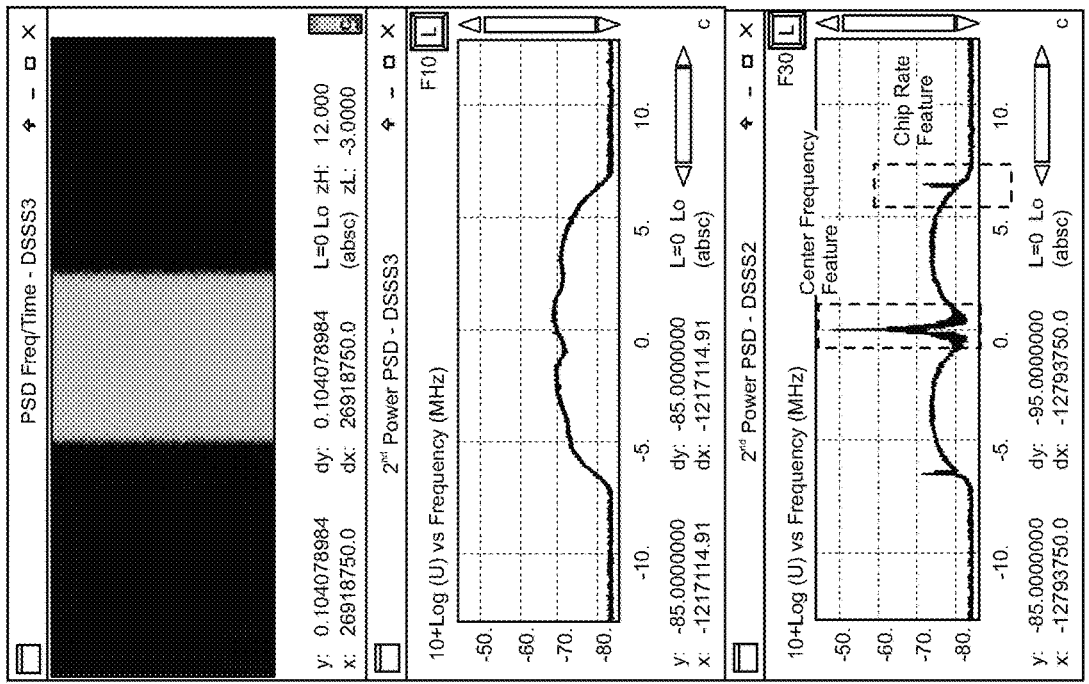
Figure 13:
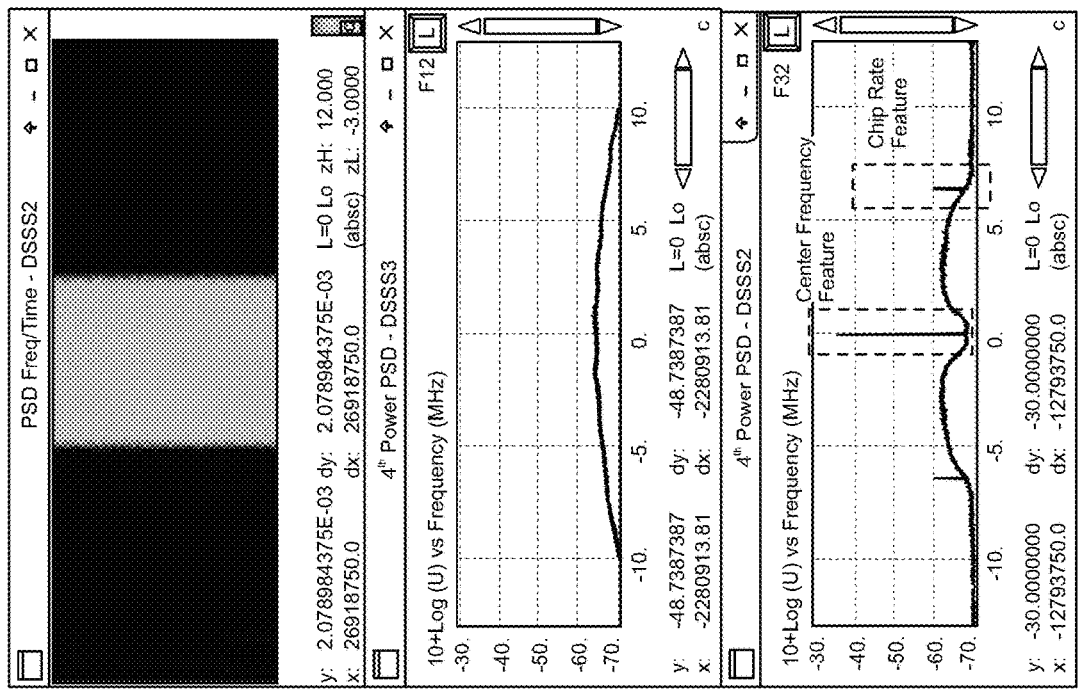

The introduction of chaos alone does not completely eliminate features in the AM PSD. At high signal power a rate line can still be observed at the chip rate. This is depicted in FIG. 13 where the use of chaos in DSSS3 suppresses features in the higher order PSDs seen in DSSS2. In the AM PSD, the chaos reduces the magnitude of the rate line peak but it is still observable.

Figure 14:
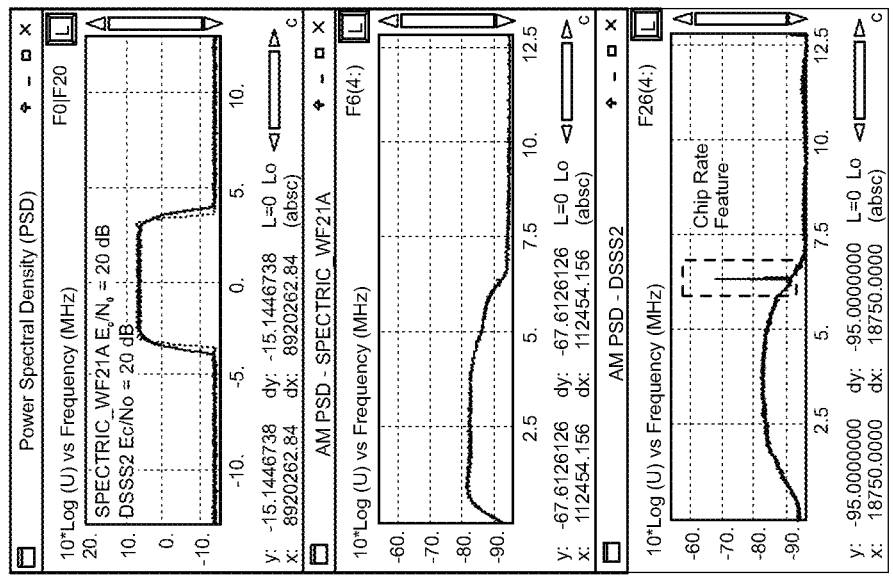
FIG. 14 depicts a plot that shows the effect of using both chaos and custom pulse shape filters to suppress blind detection features in the AM and higher order PSDs, according to still another aspect of the present invention.
Figure 14:
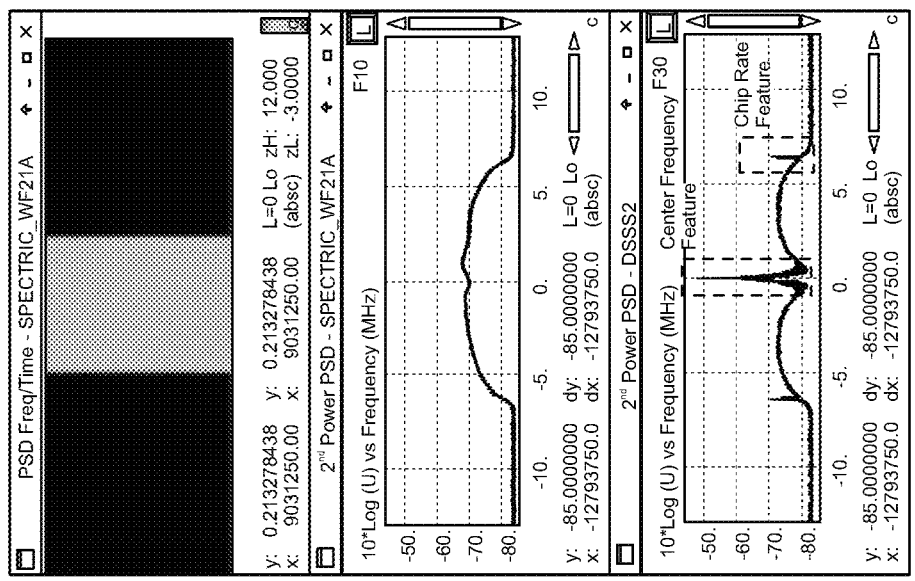
Figure 14:
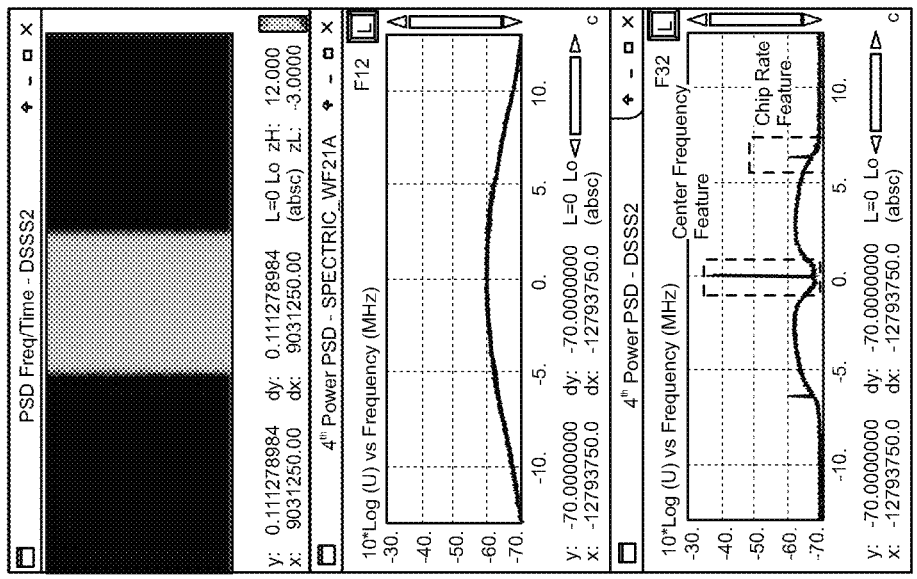

In order to remove the AM rate line at the chip rate, the present invention utilizes custom pulse shape filters. Blind detection features for the DSSS2 and SPECTRIC_WF21A waveforms are compared in FIG. 14. The use of both chaos and custom pulse shape filters in the transmitter of the present invention is shown to suppress blind detection features in the AM and higher order PSDs. At these much higher than intended operating signal powers in theoretical AWGN, a small chip rate feature can be seen in the SPECTRIC_WF21A AM PSD at less than 1 dB above the localized noise floor. Additional analysis below will demonstrate that the transmitter of the present invention is immune to blind AM rate line detection techniques at $E_c/N_0$ values in the intended operating range.

Figure 15:
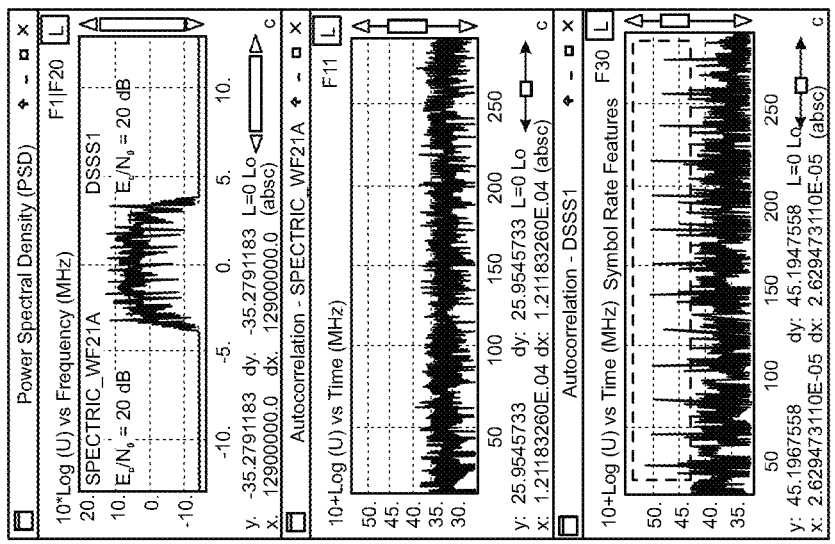
FIG. 15 depicts a plot that shows how the introduction of non-repeating "max length" sequences eliminates autocorrelation features, according to yet another aspect of the present invention, by comparing the autocorrelation of the DSSS1 and the waveforms of the exemplary embodiment of the present invention.

DSSS signals that use "textbook" repeating spreading codes are vulnerable to blind detection of spreading factor and underlying symbol rate through autocorrelation techniques. The introduction of non-repeating "max length" sequences eliminates autocorrelation features. FIG. 15 illustrates this by comparing the autocorrelation of the DSSS1 and waveforms of the present invention.

Figure 16:
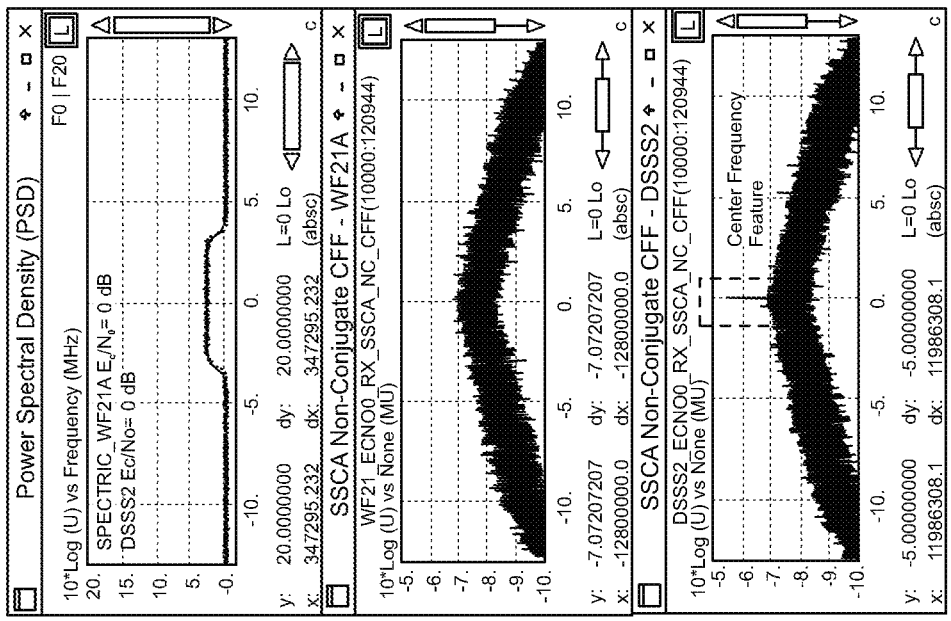
FIG. 16 depicts a plot that shows how the exemplary method of the present invention completely eliminates identifying features in a blind Cyclostationary Non-Conjugate Cyclic Feature Function (NC-CFF), which is a powerful blind detection technique that can yield detectable features for both cyclic frequencies and spectral frequency offset, wherein the figure illustrates how a traditional DSSS signal exhibits features in the NC-CFF at the chip rate while the exemplary embodiment of the present invention does not, according to yet another aspect of the present invention.
Figure 16:
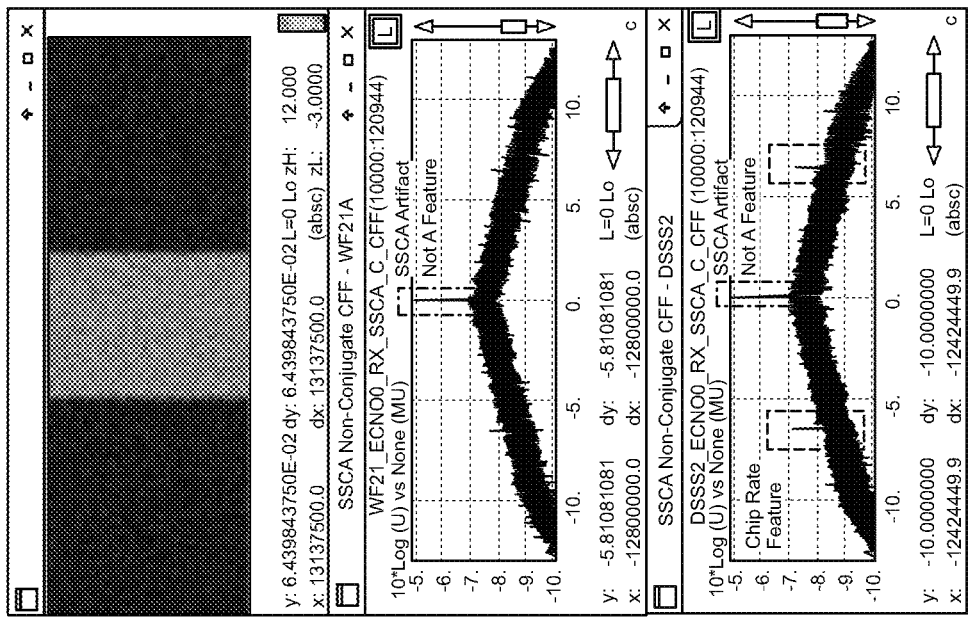

The Strip Spectral Correlation Analyzer (SSCA) is a blind cycle frequency estimator. Unlike classical cyclostationary techniques, the SSCA does not require a-priori knowledge of symbol rate or chip rate. As such, SSCA is a powerful blind technique that can yield detectable features for both cyclic frequencies and spectral frequency offset. In this analysis both the Non-Conjugate Cyclic Feature Function (NC-CFF) and Conjugate Cyclic Feature Function (C-CFF) are examined. The present invention completely eliminates identifying features in the blind cyclostationary NC-CFF. FIG. 16 illustrates how a traditional DSSS signal exhibits features in the NC-CFF at the chip rate while the present invention does not.

At higher than intended operating signal powers in theoretical AWGN, a small chip rate feature can be seen in the SPECTRIC_WF21A Conjugate-CFF at less than 0.5 dB above the localized noise floor. Additional analysis below will demonstrate that SPECTRIC_WF21A is immune to SSCA blind cyclostationary detection techniques at $E_c/N_0$ values in the intended operating range.

In traditional directed cyclostationary detection a frequency shift is specified based on a known cyclic feature rate, which is either the symbol rate, chip rate, or frame rate. Analysis indicates that detection is quite sensitive to specified cycle rate, with features deteriorating rapidly outside approximately 0.1% of the correct cycle frequency. For correctly guessed chip rate, at higher than operational SNR, the present invention reduces but does not eliminate directed cyclostationary search features compared to traditional DSSS.

Figure 17A:
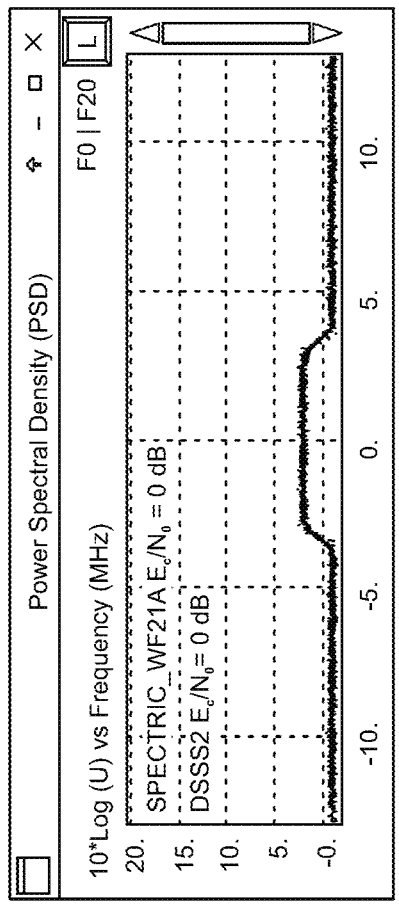
FIGS. 17A-C depict plots that show that at $E_c/N_0=0$ dB traditional DSSS has more recognizable cyclostationary features than the exemplary embodiment of the present invention.
Figure 17A:
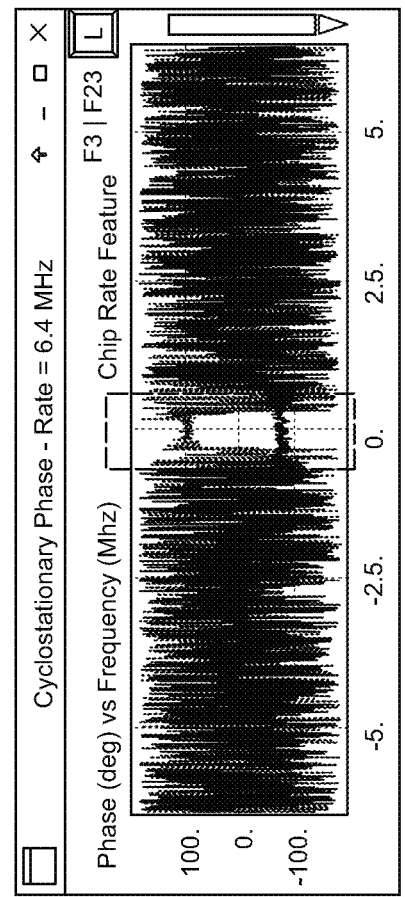
Figure 17B:
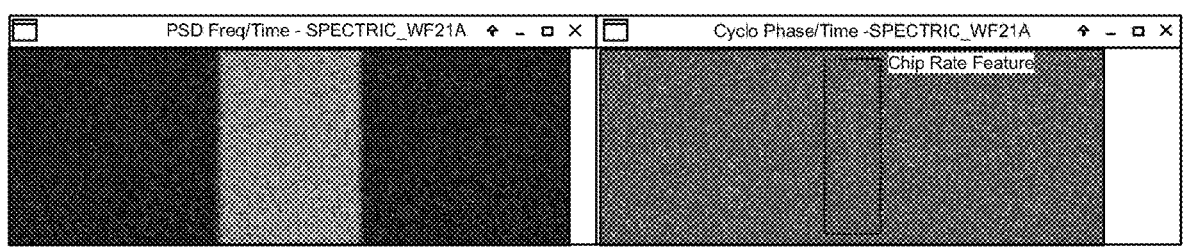
Figure 17C:
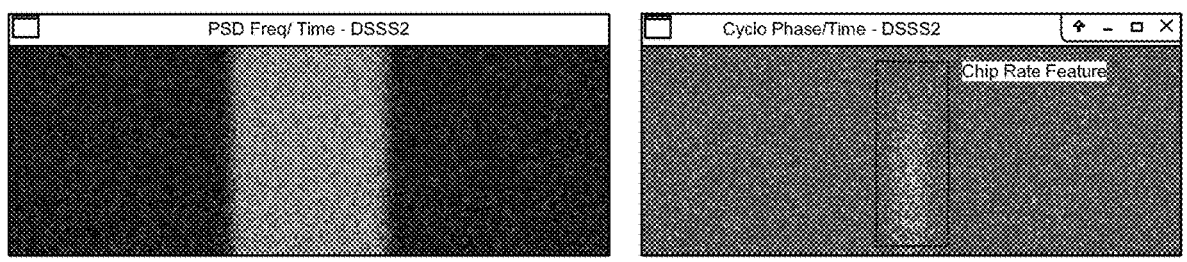

FIGS. 17A-C show that at $E_c/N_0=0$ dB traditional DSSS has more recognizable cyclostationary features than the present invention.

Figure 18:
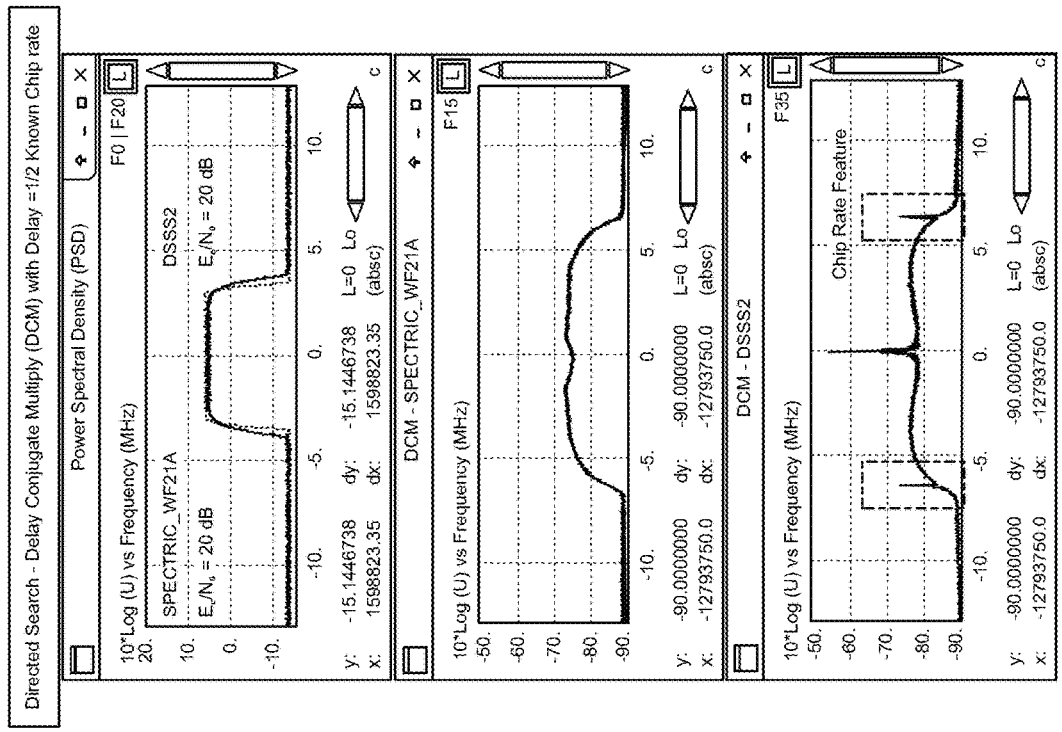
FIG. 18 depicts a plot that shows how the use of chaos in an exemplary embodiment of the present invention eliminates identifying features for Delay Conjugate Multiply (DCM) techniques by illustrating that traditional DSSS signals exhibit features in the DCM while the waveform of the exemplary embodiment of the present invention does not, according to still another aspect of the present invention.

A directed DSSS search technique often described in classic academic literature is the use of a Delay Conjugate Multiply (DCM) technique with optimal delay at one-half of the known chip duration. The use of chaos eliminates identifying features for Delay Conjugate Multiply (DCM) techniques. As illustrated in FIG. 18, traditional DSSS signals exhibit features in the DCM while the present invention's waveform does not.

Analysis shows significant advantages in non-detectability of the waveform of the present invention compared to traditional DSSS at much higher than intended operating receive power. The use of chaos and custom pulse shape filters eliminates or greatly reduces detection features even at high SNRs.

Figure 19:
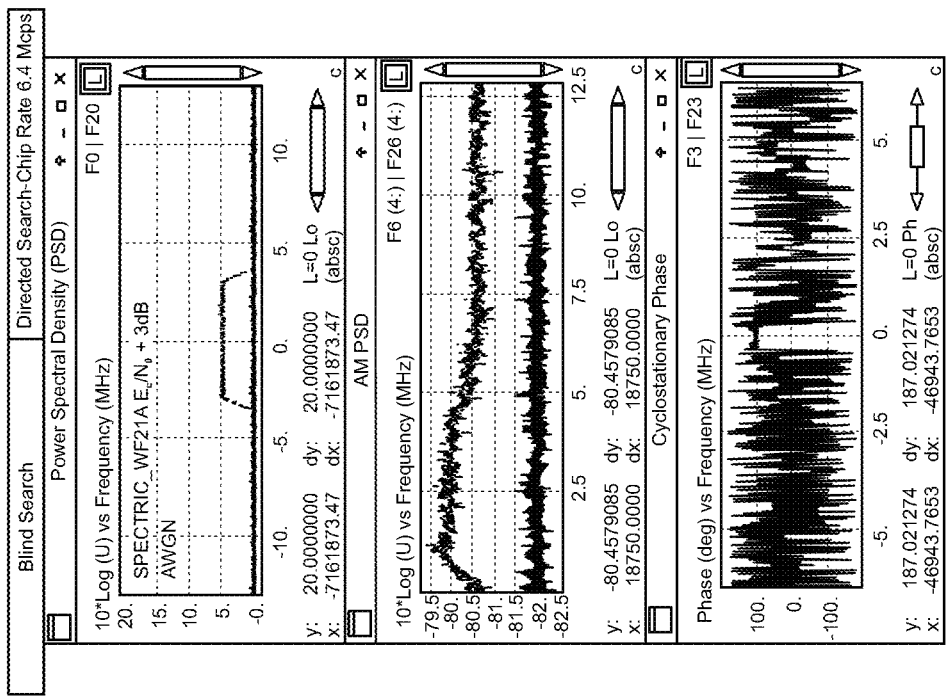
FIG. 19 depicts a plot that illustrates at $E_c/N_0=3$ dB that the waveform of the exemplary embodiment of the present invention is visible in the PSD above the calibrated AWGN noise floor and has a directed search cyclostationary phase feature at a known chip rate of 6.4 Mcps; but even at this higher than operational $E_c/N_0$, the key blind search methods (AM, 2nd Power, and 4th Power PSDs) do not show any detectable features, according to yet another aspect of the present invention.
Figure 19:
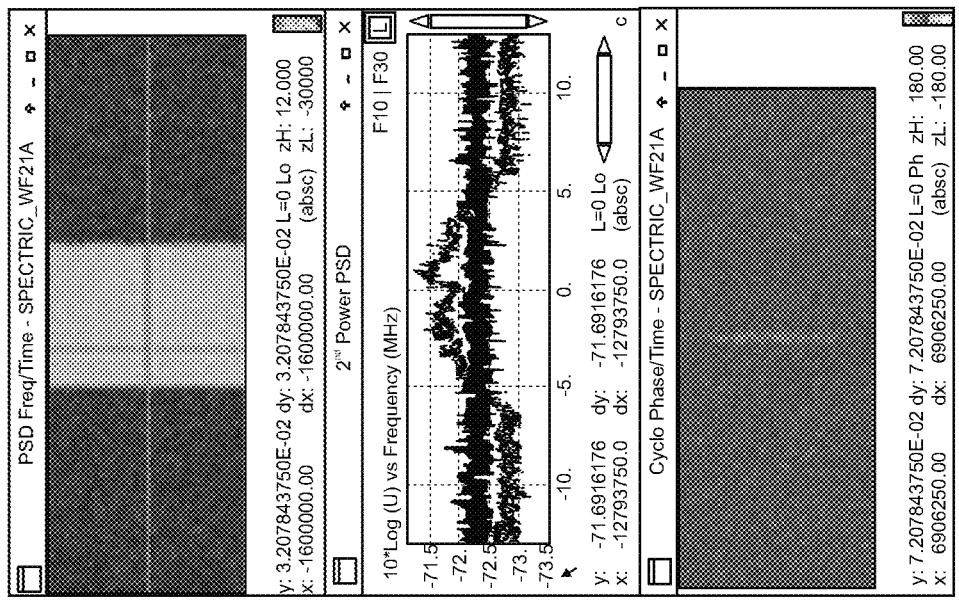
Figure 19:
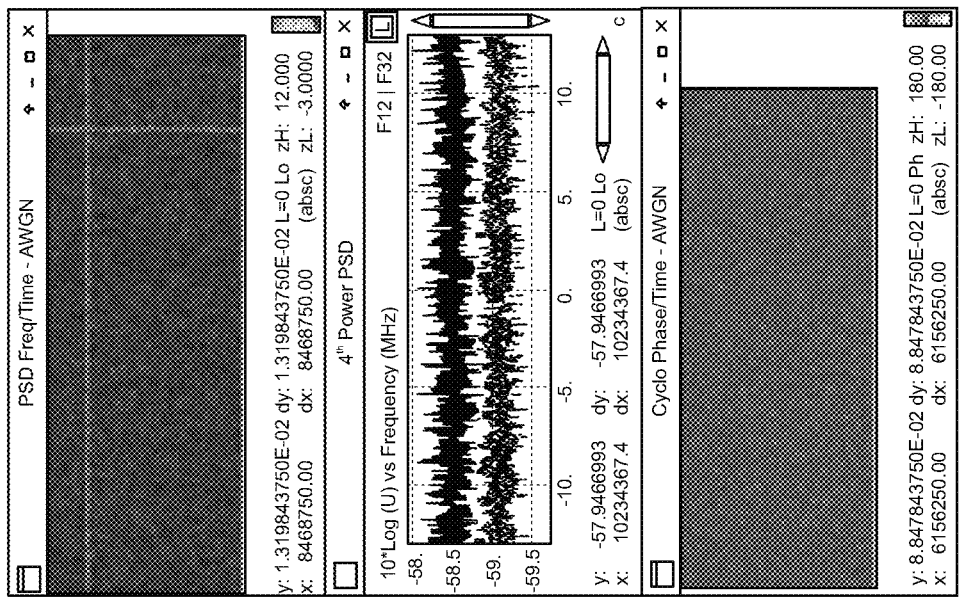

Before progressing to operational SNR analysis, it is useful to examine how the present invention looks in a calibrated AWGN environment. As FIG. 19 illustrates, at $E_c/N_0=3$ dB the waveform of the present invention is visible in the PSD above the calibrated AWGN noise floor and has a directed search cyclostationary phase feature at a known chip rate of 6.4 Mcps. However, even at this higher than operational $E_c/N_0$, the key blind search methods (AM, 2nd Power, and 4th Power PSDs) do not show any detectable features.

Key findings of the high SNR analysis are summarized in Table 2. The number "1" indicates which features are present; the number "2" indicates no features are present; and the number "3" indicates reduction in feature but not total elimination.

TABLE 2

Detectable Features for Traditional DSSS and Present Invention at High SNR ($E_c/N_0$ at 10-30 dB above operating range)

| | DSSS1 | DSSS2 | DSSS3 | Present Invention |
|---|---|---|---|---|
| BLIND | | | | |
| PSD2 | Chip Rate Symbol Rate[1] | Chip Rate[1] | None[3] | None[3] |
| PSD4 | Chip Rate Symbol Rate[1] | Chip Rate[1] | None[3] | None[3] |
| AM PSD | Chip Rate1 Symbol Rate[1] | Chip Rate[1] | Chip Rate[1] | None[3] |
| Autocorrelation | Symbol Rate[1] | None[3] | None | None[3] |
| Cyclostationary SSCA NC-CFF | Chip Rate[1] | Chip Rate[1] | None | None[3] |
| Cyclostationary SSCA C-CFF | Chip Rate[1] | Chip Rate[1] | Chip Rate[2] | Chip Rate[2] |
| DIRECTED | | | | |
| Cyclostationary with known cyclic frequency | Chip Rate[1] | Chip Rate[1] | Chip Rate[2] | Chip Rate[2] |
| DCM with known chip rate | Chip Rate[1] Symbol Rate[1] | Chip Rate[1] | None[3] | None[3] |

Detectability at Operational SNRs

Figure 20:
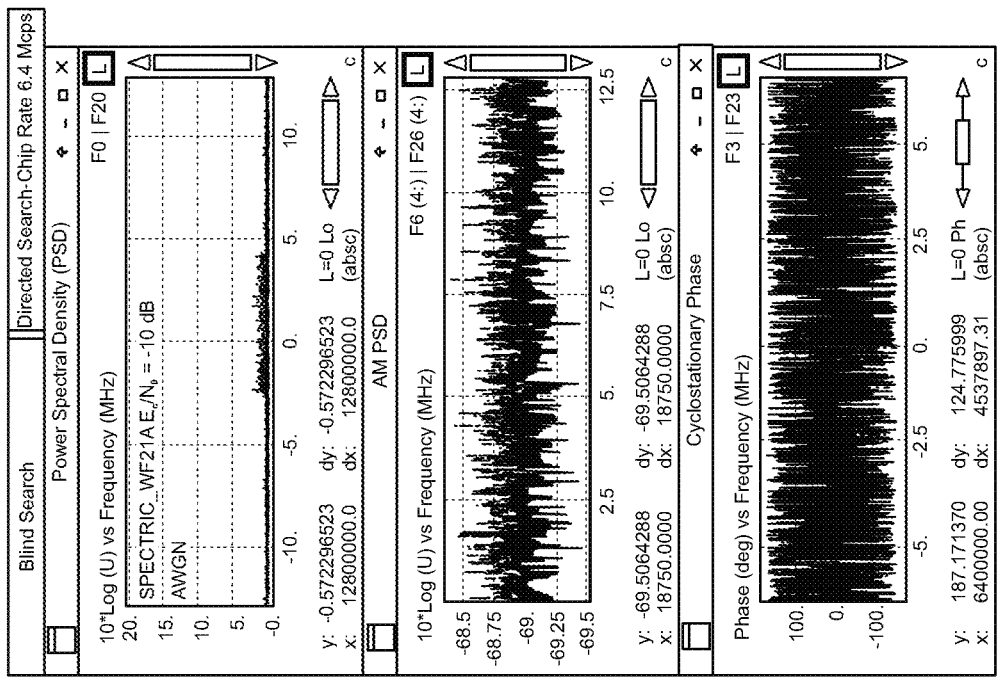
FIG. 20 depicts a plot that shows how the exemplary embodiment of the waveform of the present invention has the ability to be indistinguishable from the noise environment while closing the link with the intended receiver, of which the intended operating $E_c/N_0$ is expected to be −10 dB to −18 dB, and the figure shows that at the higher end of the operational range the signal is barely perceptible above the theoretical AWGN floor and does not show features for key blind and directed search methods.
Figure 20:
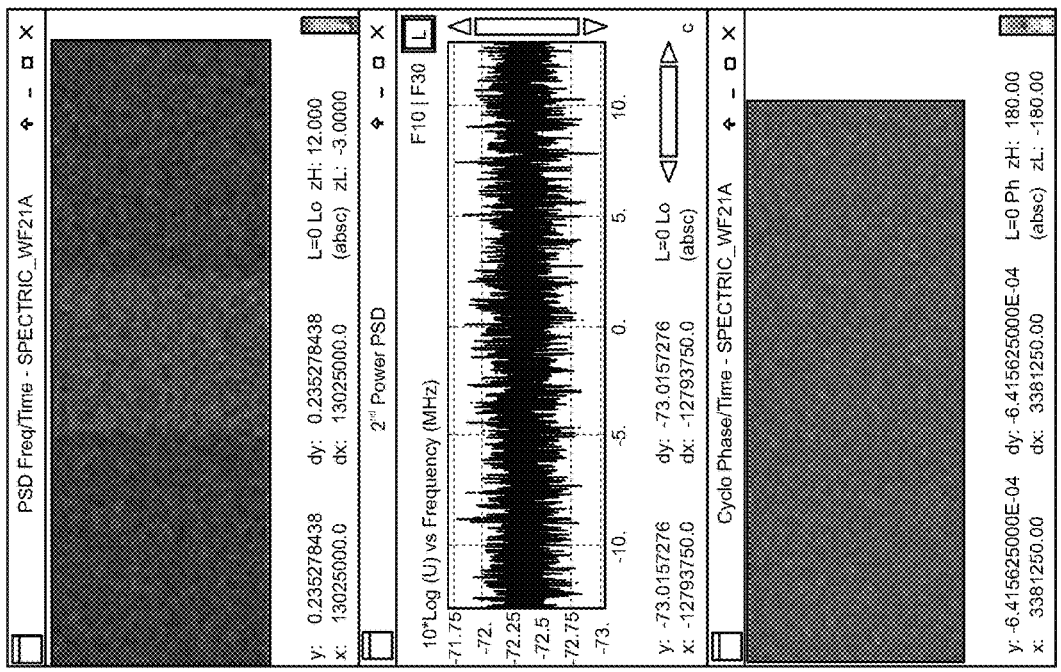
Figure 20:
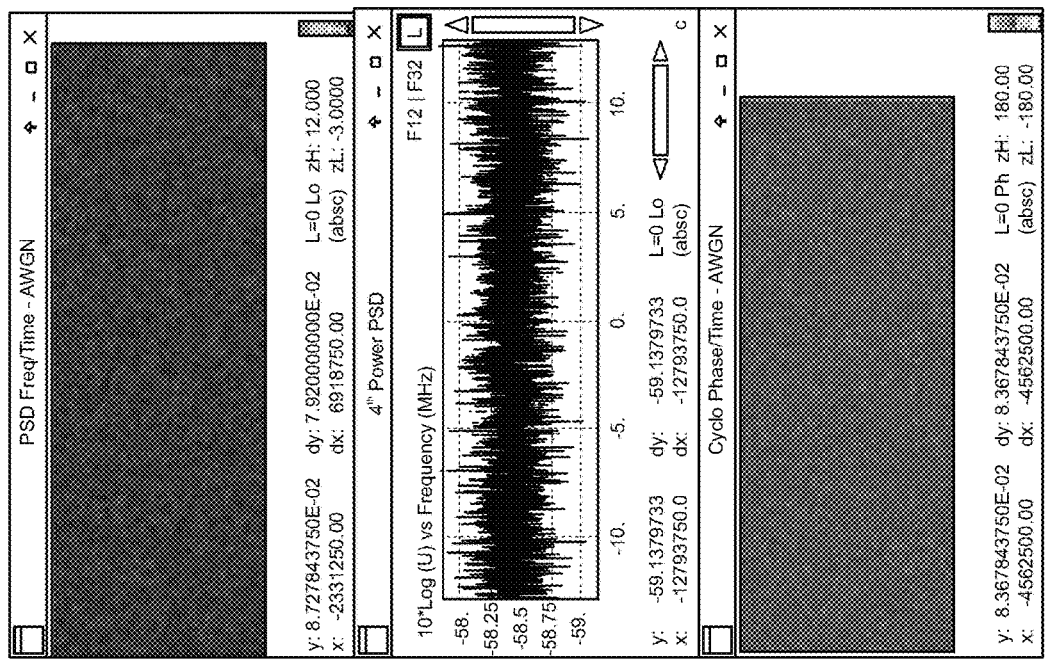

The driving motivation in design and development of the waveform of the present invention is the ability to be indistinguishable from the noise environment while closing the link with the intended receiver. The intended operating $E_c/N_0$ is expected to be −10 dB to −18 dB. FIG. 20 shows that at the higher end of the operational range the signal is barely perceptible above the theoretical AWGN floor and does not show features for key blind and directed search methods.

Figure 21:
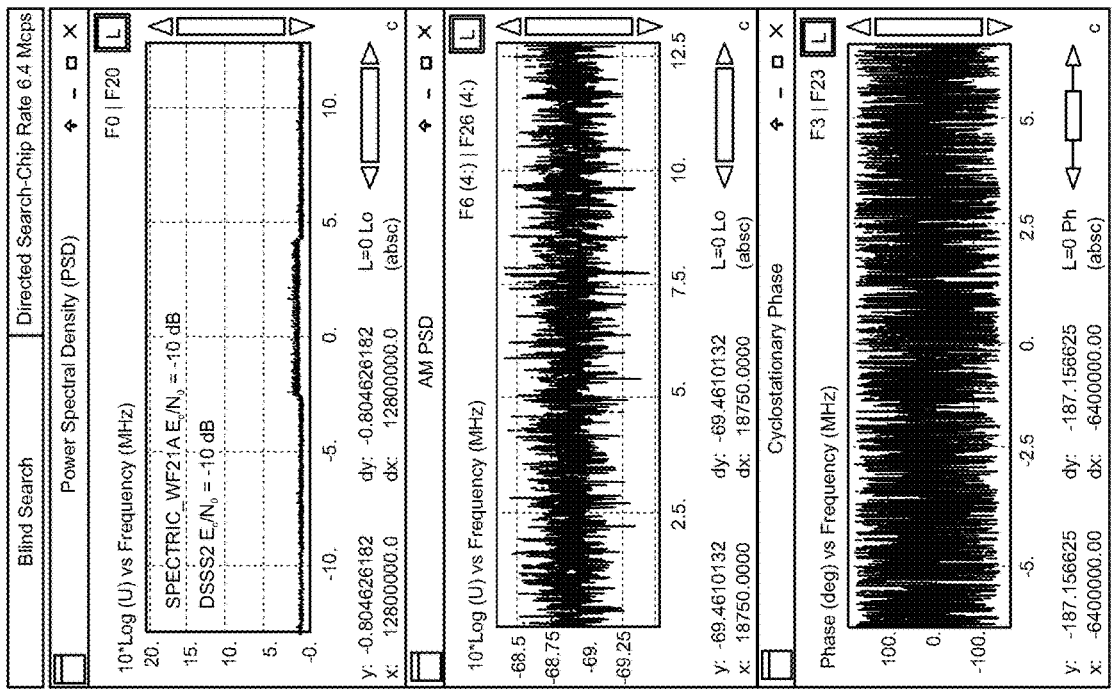
FIG. 21 depicts a plot that shows that at the same $E_c/N_0$ DSSS2 has detectable chip-rate features while the waveform of the exemplary embodiment of the present invention does not, according to yet another aspect of the present invention.
Figure 21:
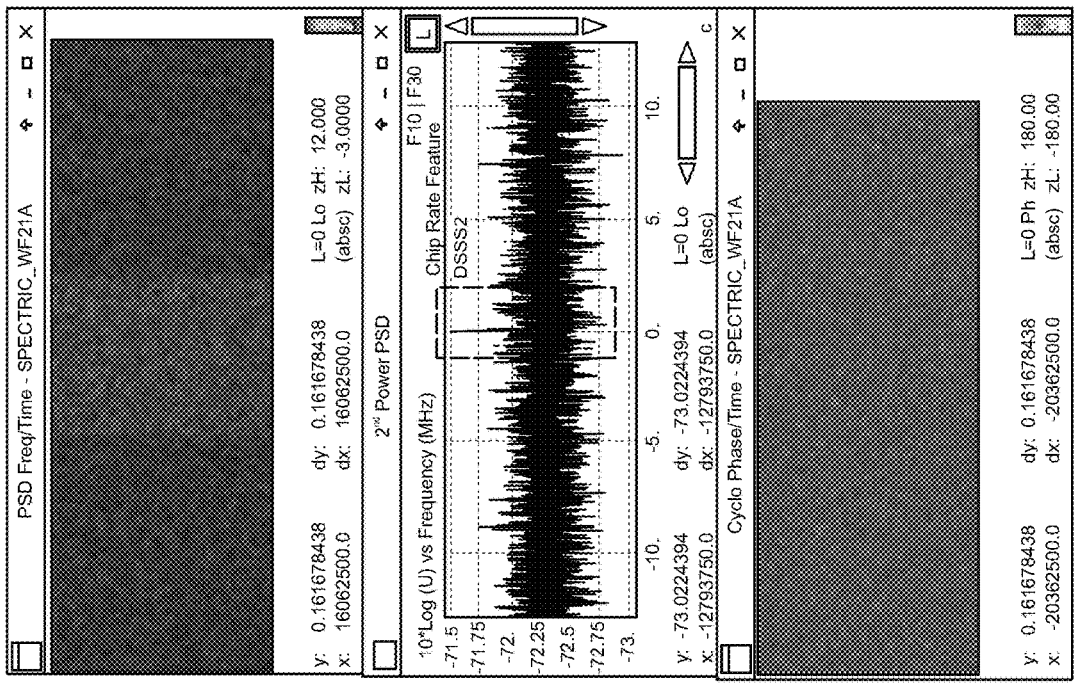
Figure 21:
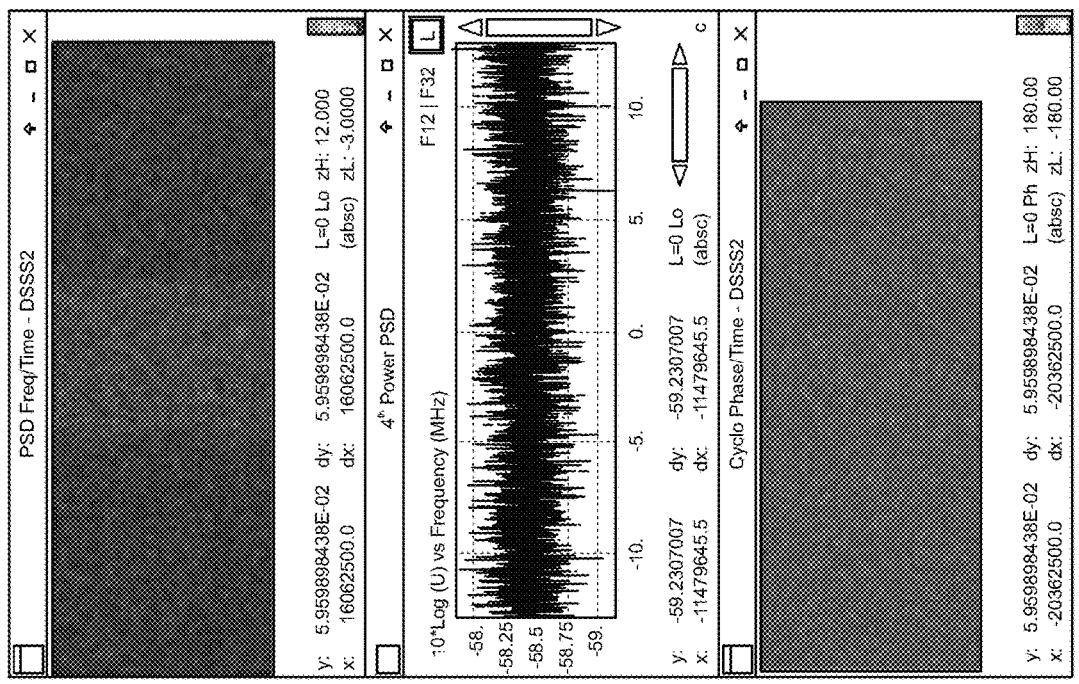
Figure 22:
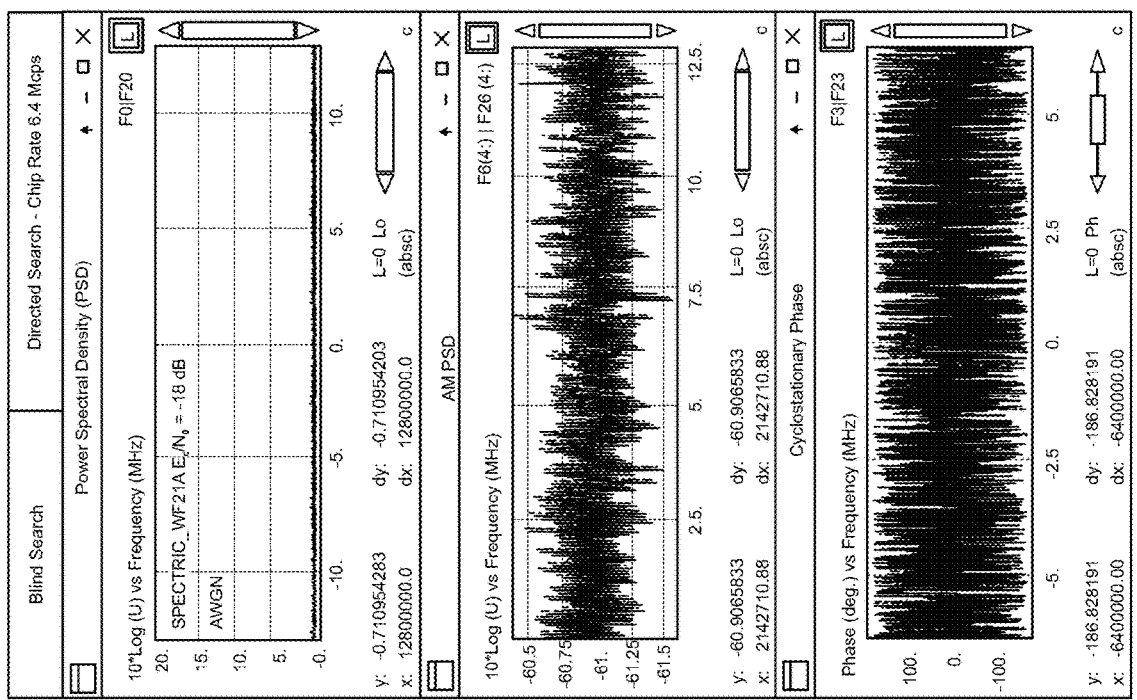
FIG. 22 depicts a plot that shows how the waveform of the exemplary embodiment of the present invention is completely indistinguishable from the noise environment with both blind and directed search methods, according to yet another aspect of the present invention.
Figure 22:
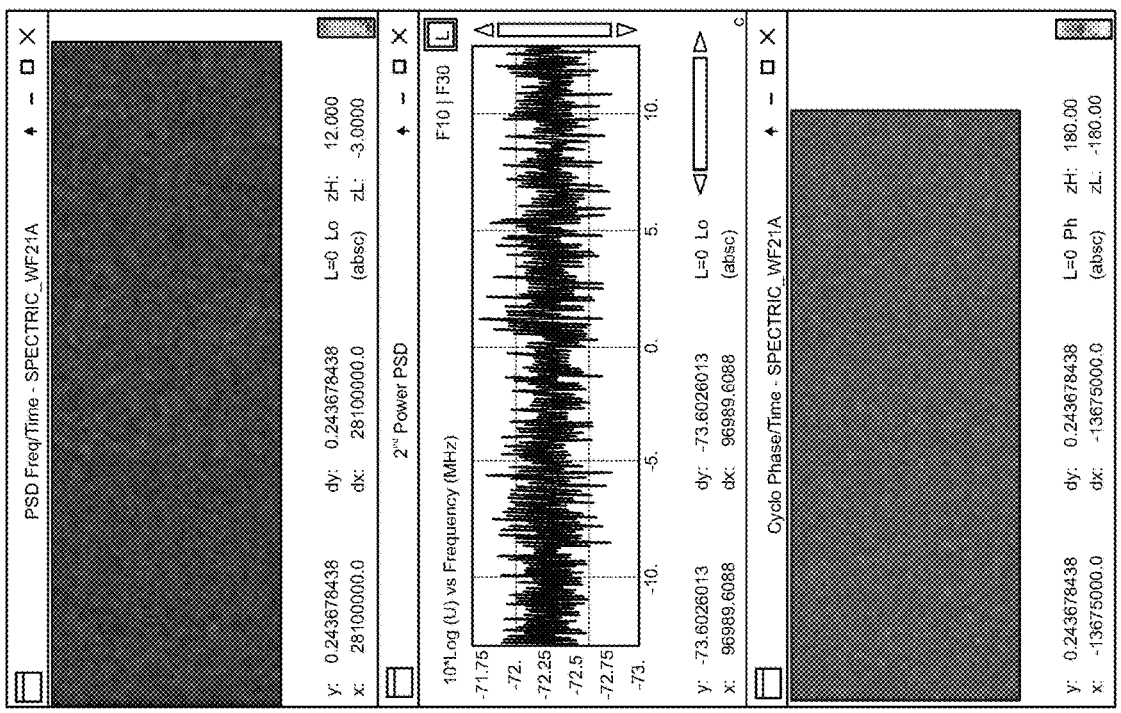
Figure 22:
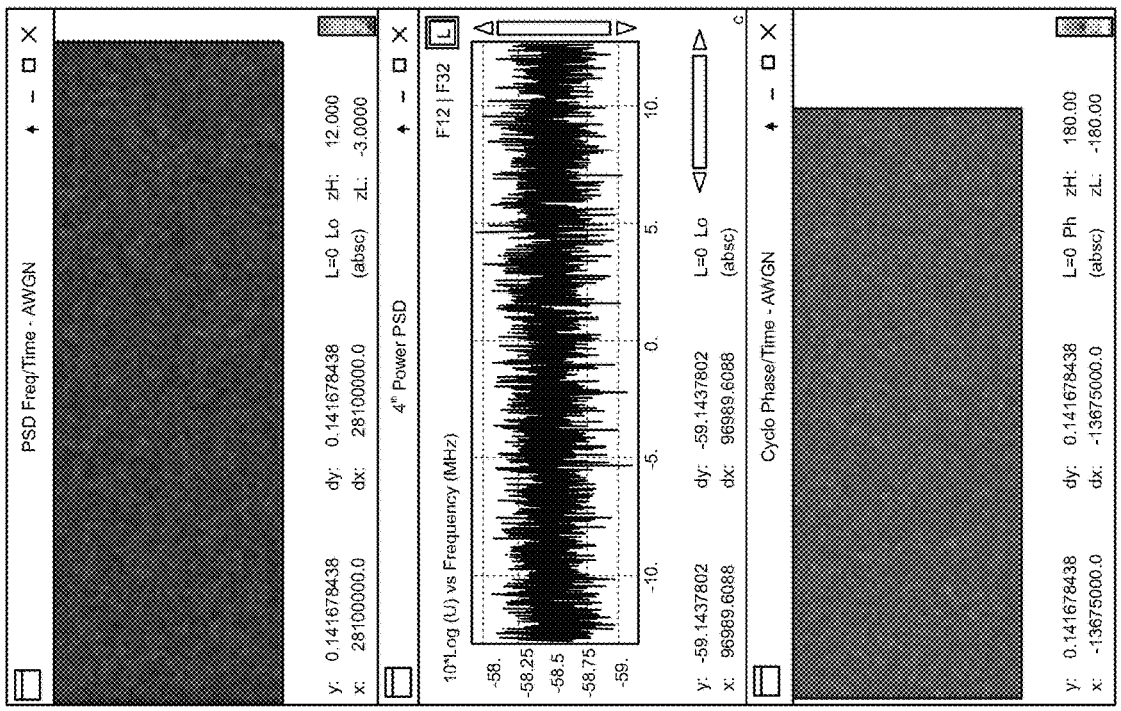

By comparison, FIG. 21 illustrates that at the same $E_c/N_0$ DSSS2 has detectable chip-rate features while the present invention does not. At the lower end of the operating power range, the present invention is completely indistinguishable from the noise environment with both blind and directed search methods as shown in FIG. 22.

Results—Detectability for Longer Burst Lengths

For traditional DSSS signals, longer burst lengths lead to more detectable features through the "processing gain" obtained by averaging over greater active signal durations. Therefore, it is important to examine the resistance of the present invention to detection for longer transmissions.

Figure 23:
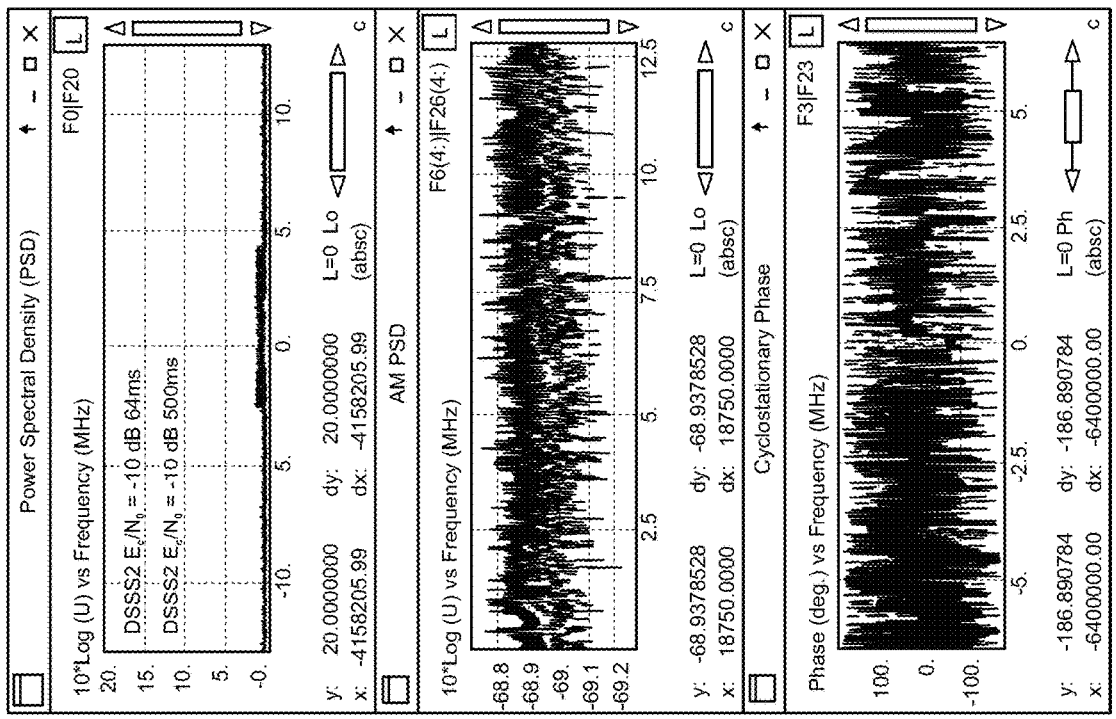
FIG. 23 depicts a plot that shows a comparison between a 64 ms and 500 ms burst for DSSS2 and shows the emergence of a detection feature in the 2nd order PSD at $E_c/N_0=−10$ dB to demonstrate the ability for burst duration to impact detectability, according to yet another aspect of the present invention.
Figure 23:
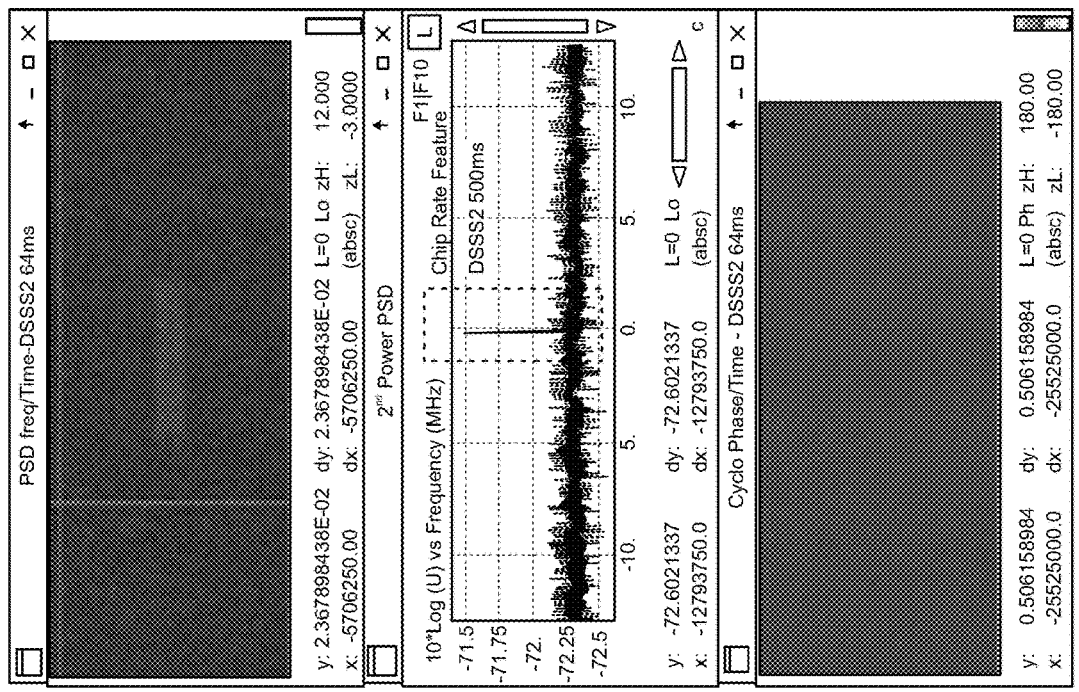
Figure 23:
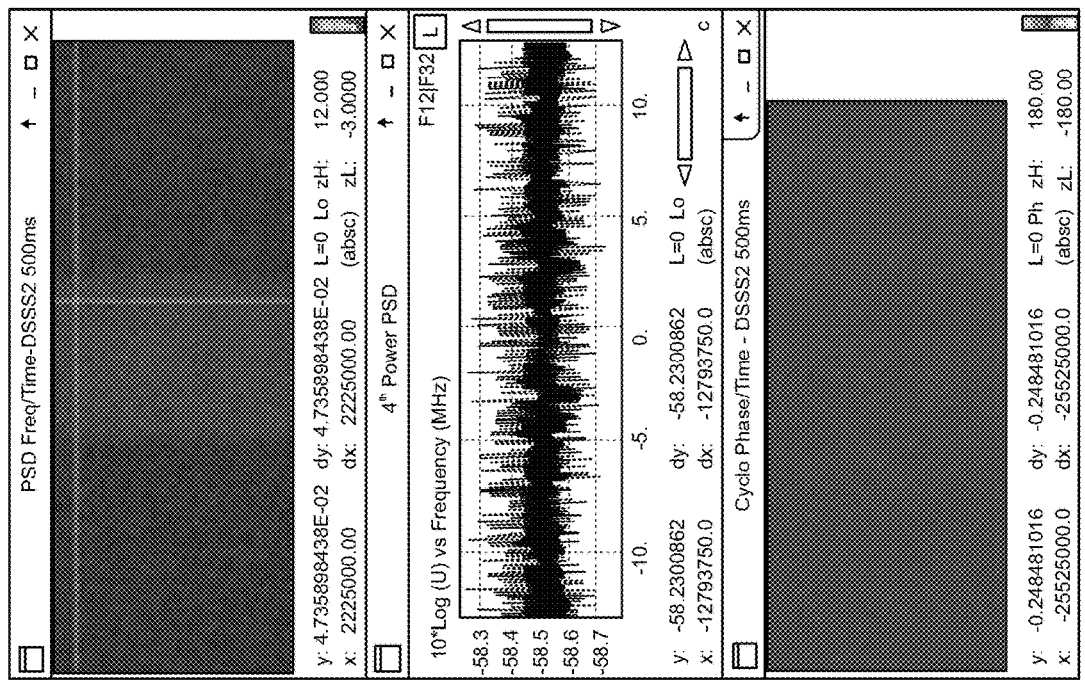
Figure 24:
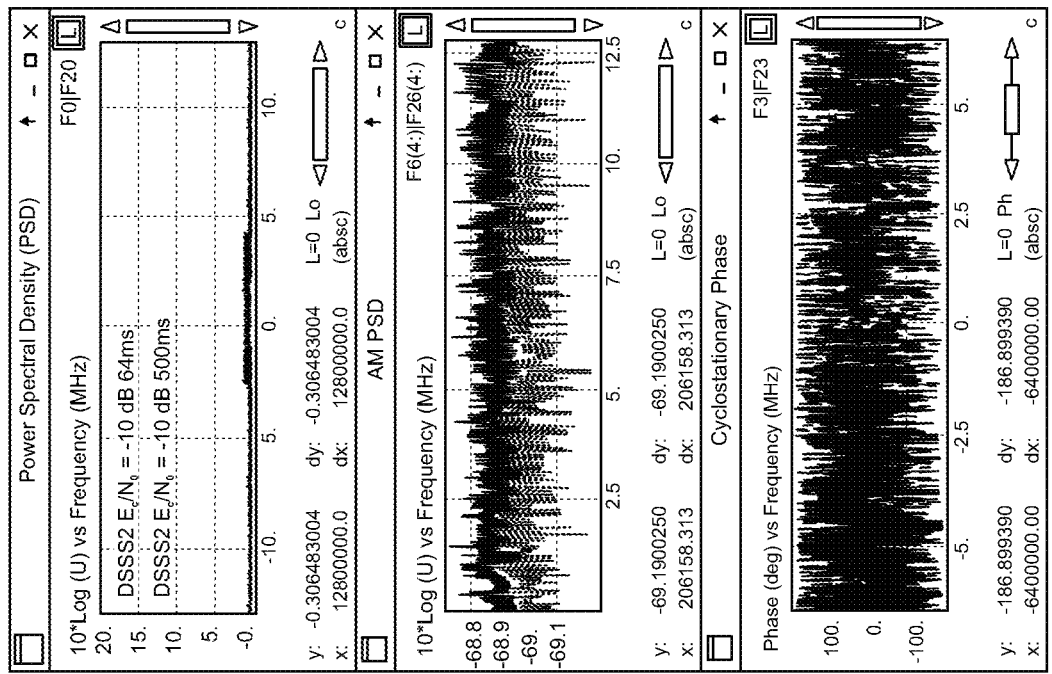
FIG. 24 depicts a plot that shows that even with a burst length of 1 second that the exemplary embodiment of the present invention is resistant to detection processing gained through integrating over longer durations and emphasizes the advantage that the exemplary embodiment of the present invention provides in resistance to both blind and directed search techniques, according to yet another aspect of the present invention.
Figure 24:
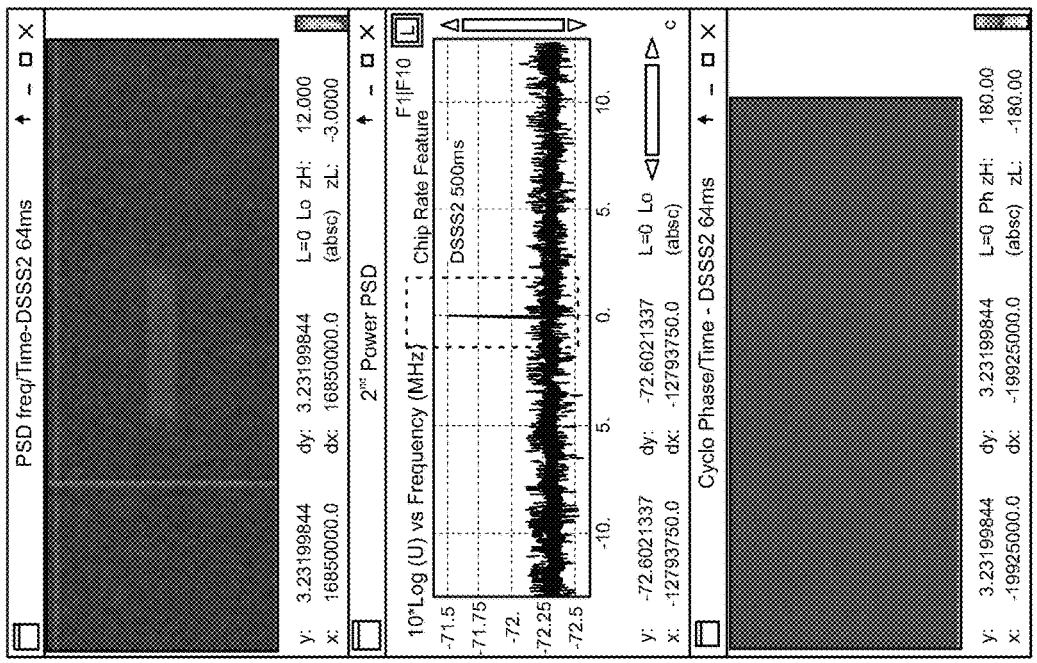
Figure 24:
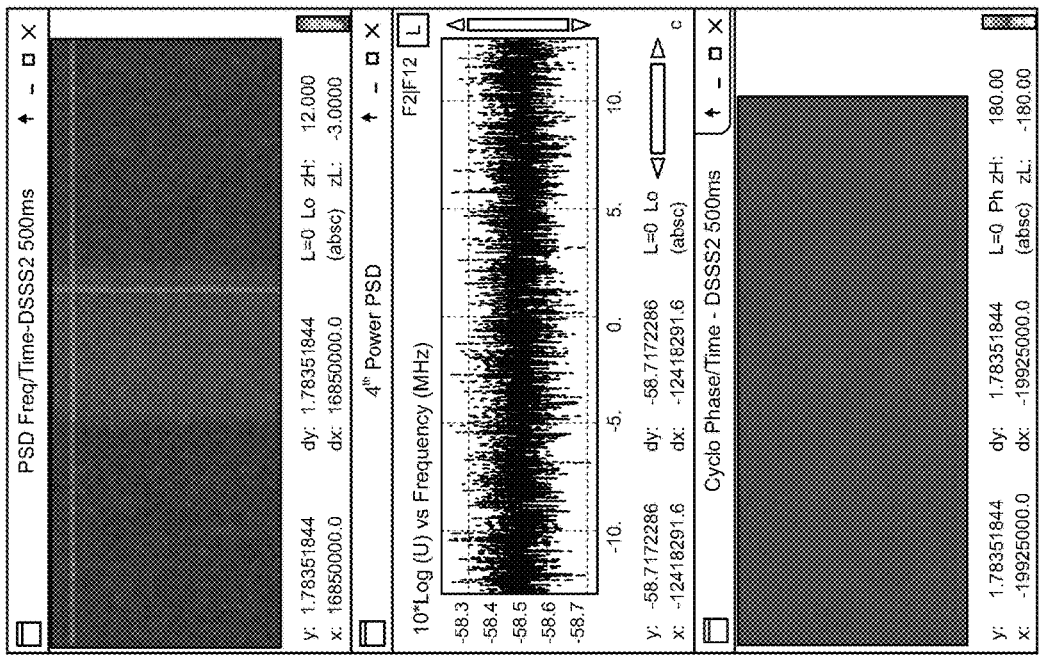

To demonstrate the ability for burst duration to impact detectability, FIG. 23 compares a 64 ms and 500 ms burst for DSSS2 and shows the emergence of a detection feature in the 2nd order PSD at $E_c/N_0=−10$ dB. By comparison FIG. 24 shows that even with a burst length of 1 second that the present invention is resistant to detection processing gained through integrating over longer durations. It also emphasizes the advantage that the present invention provides in resistance to both blind and directed search techniques.

Summary of LPI/LPD Analysis

The present invention has been shown to be resistant to common blind detection techniques even at SNRs 10-30 dB higher than the expected operating range. The use of chaos eliminates chip rate features in high order PSDs. The addition of custom pulse shape filters suppresses chip rate features in the AM PSD. The directed search delay multiply technique using the correct chip rate also does not exhibit detectable features.

It has also been demonstrated that the present invention is immune to both blind and directed cyclostationary techniques at operational power levels. This is extremely important considering the power of cyclostationary techniques to identify cyclic features of many other signals operating at low SNRs. Even if an unintended receiver correctly deduced the chip rate and integrated the cyclic spectrum over much longer than intended burst durations, the present invention would not show detectable features.

Through detailed analysis and comparison against traditional DSSS signals it has been shown that present invention provides several unique advantages as an LPI/LPD waveform and will have no detectable features at the intended operating powers.

Evaluation of Detection/Acquisition in Both LOS and NLOS Channels

Figure 25:
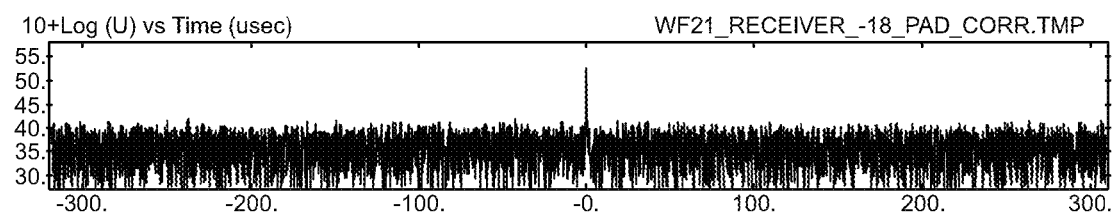
FIG. 25 depicts a plot that show an example of the output of the detector of the exemplary embodiment of the present invention for an input signal SNR of −18.0 dB, in which the peak correlation is approximately 11 dB above the noise floor, according to yet another aspect of the present invention.

Software simulation is used to benchmark the performance of the present invention waveform in various RF environments. We evaluated the detection sensitivity and decode sensitivity. The present invention's signal detection sensitivity was evaluated through simulation by sending the waveform through LOS and NLOS channels and then degrading the signal with AWGN at various signal-to-noise ratios (SNRs). The degraded complex baseband waveform was input into the detector of the present invention to determine likelihood of successful detection. The output of the detector is a confidence score and a time of arrival (TOA) estimate. The confidence score is a measure of the output of the cross correlation between the synthesized acquisition sequence and the received signal above a localized noise floor. Empirically, a threshold of 6.0 dB or higher can be used for reliable signal detection. FIG. 25 is an example of the output of the detector of the present invention for an input signal SNR of −18.0 dB. The peak correlation is approximately 11 dB above the noise floor.

The SNRs tested ranged from −30.0 dB to 0.0 dB in 0.5 dB increments. The channel impairments used two different channel models for the LOS and NLOS environments. The LOS channel model was based on the GSM Rural Area 6-tap case which uses a Rician fading model. Note that the Rician fading model incorporates a K factor that is a ratio of the power in the direct path to the power in the scattered paths. The K factor used in the simulation was 4.8824. The NLOS channel model was based on the GSM Urban Area 12-tap case which uses a Rayleigh fading model. Both the LOS and NLOS models used a transmitter velocity of 23.352 m/s or 52 MPH.

Evaluation of Detection/Acquisition Tolerance to In-Band Interference and/or Jamming Simulation was performed to determine the SPECTRIC_WF21A detection sensitivity in the presence of ammers. Three scenarios of in-band jamming were evaluated: (i) Narrowband jammer; (ii) wideband jammer; and (iii) barrage jammer.

A narrowband jammer is defined as a jammer whose bandwidth does not occupy the full bandwidth of the waveform. For simulation the narrowband jammer used a bandwidth of 1 MHz. Typically, electronic warfare (EW) systems that use narrowband jammers concentrate all of their power at a single RF. The downside is that this technique is not effective against frequency agile targets.

A wideband jammer is defined as a jammer whose bandwidth is larger than the instantaneous bandwidth. For simulation the wideband jammer used a bandwidth of 10 MHz. Analysis of this technique is similar to raising the noise floor, or decreasing the SNR, of the signal of interest.

A barrage jammer, or sometimes referred to as a tone jammer, jams multiple frequencies at once. The simulation used five 1 MHz jammers, centered 2 MHz apart, spread across the band. One drawback of barrage jammers is that their energy is spread across multiple frequencies, resulting in less jamming power at each frequency. This technique is effective when the emitter transmit frequency is unknown.

Figure 26:
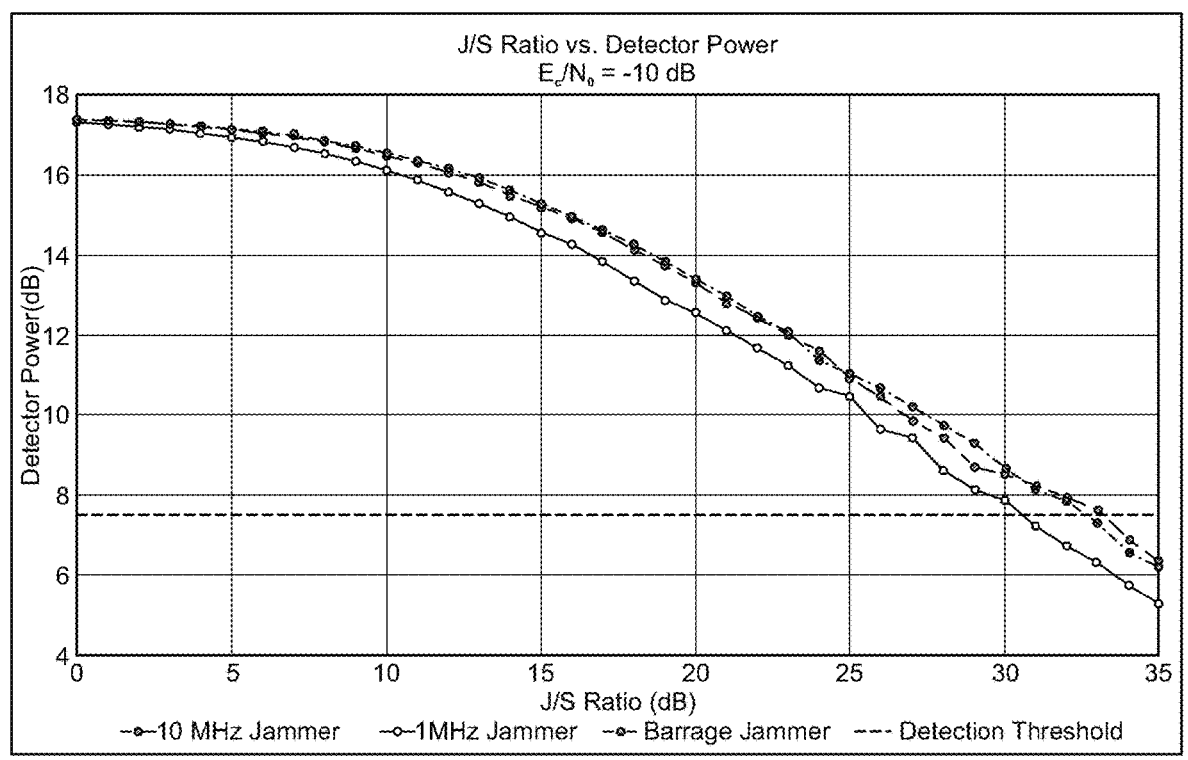
FIG. 26 depicts a plot that shows a detection power metric as a function of a Jamming to Signal (J/S) ratio, which shows that the jammer signal requires 30 dB more power than the signal of the exemplary embodiment of the present invention at the receiver for the full duration of the burst signal of the exemplary embodiment of the present invention before causing detector failure, according to yet another aspect of the present invention.

FIG. 26 shows the detection power metric as a function of the Jamming to Signal (J/S) ratio. J/S ratio is a measure of the jammer power to the signal power and can be used to determine the amount of power required to jam an emitter. In this example, at a constant waveform $E_c/N_0=-10$ dB, the J/S power was increased in 1.0 dB increments until the detector power metric fell below the detection threshold. The plots show that detection will fail once the jammer's power is 30 dB stronger than the signal at the receiver. It was assumed that the jammer transmitted for the full duration of the burst of the present invention. It was also assumed that the entire ACQUISITION sequence was used as the matched filter in the detector.

Optimized Pulse Shape Filter Design for AM Rate Line Suppression

In digital communications a common purpose of the pulse shape filter is to provides band-limited transmission without introducing inter-symbol interference (ISI). To maximize SNR at the receiver, a root-Nyquist pulse shaping filter should be used with its matched filter being used at the receiver. For optimal systems, one should consider the pulse shape filter characteristics, such as exhibiting low ISI and out-of-band leakage power. For secure communications, one should also consider the pulse shape filters' contribution to detectable features such as blind spectral analysis techniques. Specifically, the pulse shape filter may contribute to the amplitude modulation (AM) spectral feature, which is capable of exposing symbol or chip-rate information.

The pulse shape filter is defined by its coefficients as a real-valued vector $\underline{h}$ $$\underline{h}=(h_0, h_1, \ldots, h_{N-1})$$

Since the filter coefficients are real-valued, the filter is symmetric in the frequency domain. This symmetry allows one to design a filter only consider the 'right hand side' of frequencies, $\omega=[0, \pi]$. An ideal pulse shape power density is shown below which illustrates the passband region $\omega=[0, \omega_p]$, the transition region (often referred as the roll-off) $\omega=[\omega_p, \omega_s]$, and the stopband region $\omega=[\omega_s, \pi]$.

Figure 27:
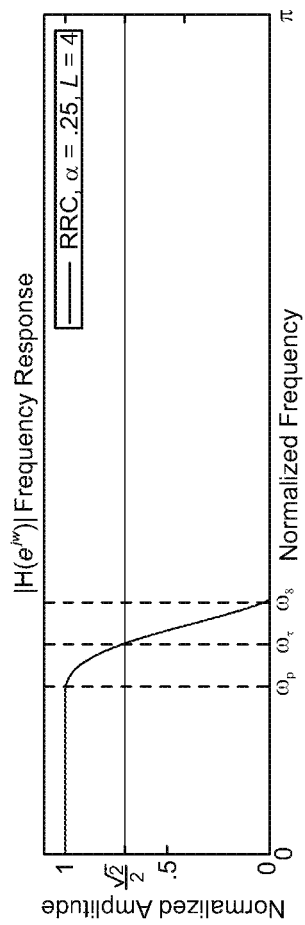
FIG. 27 depicts a frequency response of a pulse shape filter for use in the exemplary communication system described herein according to yet another aspect of the present invention.

Referring to FIG. 27, the nonlinear program is defined as a sequential quadratic programming algorithm (SQP), which minimizes the objected function $f(\underline{h})$ based on constraint functions $\underline{c}(\underline{h})$ and $c_{eq}(\underline{h})$. This may be represented as:

$$\min_{\underline{h}} f(\underline{h}) \text{ subject to } \begin{cases} \underline{c}(\underline{h}) \leq 0 \\ c_{eq}(\underline{h}) = 0 \\ -1 \leq \underline{h} \leq 1 \end{cases}$$

The objective function $f(\underline{h})$ minimizes the rate line evaluated at each discrete frequency k, which are where AM rate line(s) can be expected. AM rate lines can be expected at intervals of:

$$\omega = \frac{2n\pi}{L}, n \in \mathbb{Z} : 1 \le n \le \frac{L}{2},$$

where L is the filters oversample factor and the primary rate line located at n=1. The objective function may then be written as:

$$f(\underline{h}) = \sum \text{abs}\left[\sum_{n=0}^{N-1} |s_n| e^{-j2\pi k_n}\Big|_{k=\frac{2\pi}{L}\pi \text{ for } L=4}\right]^2 \text{ with } s_n = \sum_l h_m x'_{n-l}$$

where $s_n$ is the transmitted discrete signal and $\{x'_k\}$ is the upsampled version of a random QPSK message $\{x_k\}$.

The constraint functions $\underline{c}(\underline{h})$ and $c_{eq}(\underline{h})$ are defined as:

$$c_0(\underline{h}) \le S_{MAX} - S_{TARG}$$

$$c_1(\underline{h}) \le -\text{ISI} + \text{ISI}_{TARG}$$

$$c_{eq} = \max(h_n) - 1$$

The constraint function $c_0(\underline{h})$ limits out-of-band leakage so the filter $\underline{h}$ is forced to operate as a low pass filter with the maximum spectral power $S_{MAX}$ defined as the ratio between stopband power and peak passband power:

$$S_{MAX} = \max_{\omega > \omega_s}\left[\frac{\left|\sum_{n=0}^{N-1} h_n e^{-j\omega n}\right|^2}{\left|\sum_{n=0}^{N-1} h_n\right|^2}\right]$$

Without this constraint the optimization problem may resolve to an irregular filter that does not perform pulse shaping. The parameter $S_{TARG}$ is the maximum out-of-band spectral power to allow. While an ideal filter has an $S_{TARG}=0$, the parameter must be sufficiently high for the SQP to resolve to a solution. There is a direct tradeoff between selecting filter size N and feasible $S_{TARG}$ selection. Over-extending the parameters will either result in a solution that compromises AM rate line detection or cause the optimization algorithm to exit unsuccessfully. Additionally, sufficient frequencies ω must computed to ensure the peak stopband spectral density is accurately calculated.

The constraint function $c_1(\underline{h})$ limits ISI to an acceptable range defined by the input parameter $\text{ISI}_{TARG}$, which is selected to bound the filter $\underline{h}$ to root-Nyquist properties. $\text{ISI}_{TARG}$ should be selected to provide excellent ISI characteristics while not being too aggressive, as the optimization algorithm will either fail or produce unacceptable AM rate line results. ISI is calculated by first defining the autocorrelation of filter $\underline{h}$:

$$p[n] = h[n] * h[-n]$$

and then taking a downsampled version of the result p[n] by oversample L $$p_d[n] = p[nL]$$

so ISI is then defined as $$ISI = \frac{|p_d[0]|^2}{\sum_{n \ne 0} |p_d[n]|^2}$$

Where n=0 is the maximum of the sequence $p_d[\underline{n}]$.

The last constraint $c_{eq}(\underline{h})$, in conjunction with coefficient limits ($-1 \le \underline{h} \le 1$) places bounds on $\underline{h}$ to maintain reasonable values as a pulse shape filter.

Optimization Methods

There are likely many local minima for the above program so depending on the provided initial condition $\underline{h}_0$, the SQP could produce different results. For the nonlinear program to produce the best solution, multiple different initial states can be evaluated. A reasonable assumption for an initial state is to use a truncated root-raised cosine (RRC) function as it is the standard filter used in digital communications. To provide additional solutions, the SQP is executed N times, each with a circularly-shifted variant of the truncated RRC. Using this method, a program can cycle through iterations of various initial states $h_0$ and select the solution with the best characteristics:

Select only solutions where the SQP converges to a solution;

From the options above, select the filter with the lowest $f(\underline{h})$ score; and/or Optionally, consider other metrics for filter selection such as ISI and total out-of-band power.

Results

The optimization program was executed for a filter size N=81, oversample of L=4, and maximum roll-off factor α=0.2. The constraints $S_{MAX}$=55 dB and $\text{ISI}_{TARG}$=40 dB were selected.

Figure 28A:
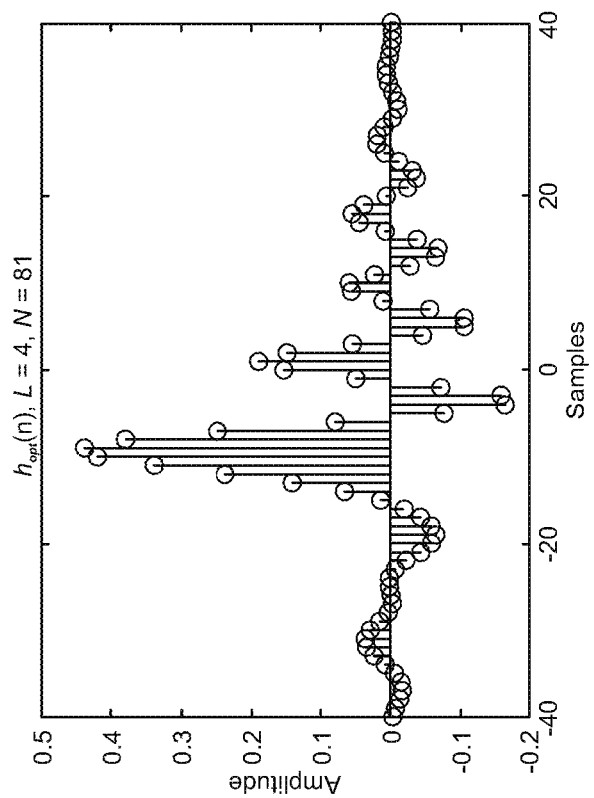
FIG. 28A and FIG. 28B depict certain characteristics of an optimized pulse shape filter for use in the exemplary communication system described herein according to still another aspect of the present invention.
Figure 28B:
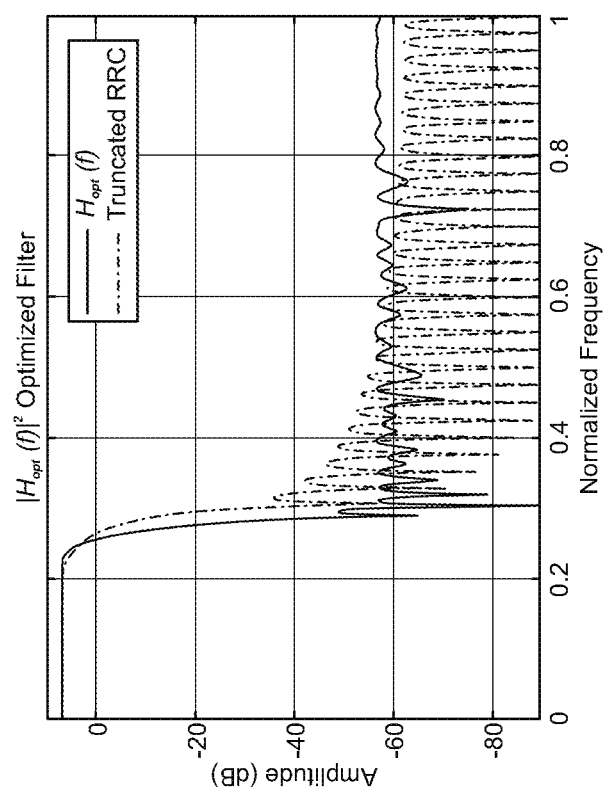

The resulting optimized filter is shown in FIGS. 28A and 28B. The resulting optimized filter is an asymmetrical filter with the expected low-pass filter characteristics. The filter response is displayed over the common truncated RRC filter. The optimized filter also strictly obeys the $\omega_s$ stopband parameter while the truncated RRC does not. The measured end-to-end ISI is 40 dB.

Figure 29A:
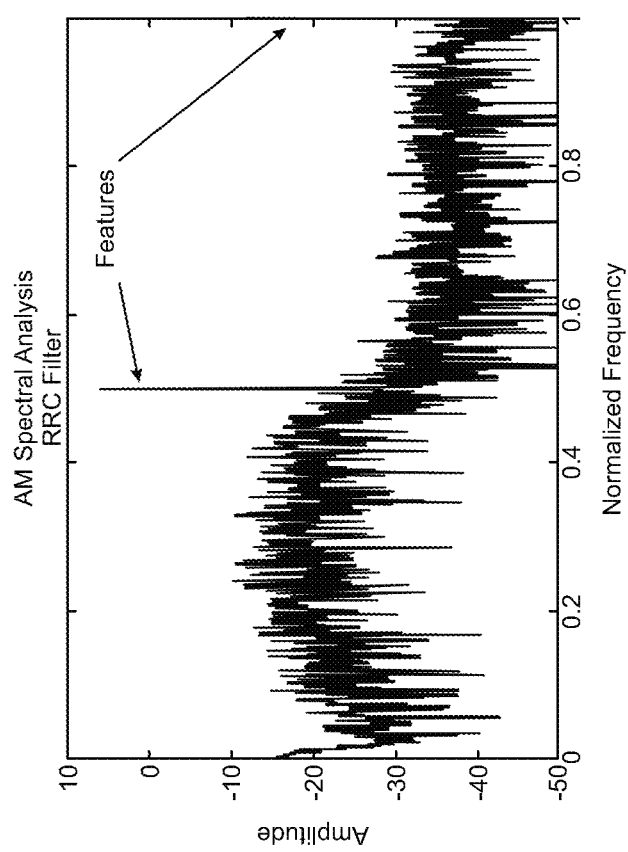
FIG. 29A and FIG. 29B depict AM spectral analyses of an optimized pulse shape filter for use in the exemplary communication system described herein according to yet another aspect of the present invention.
Figure 29B:
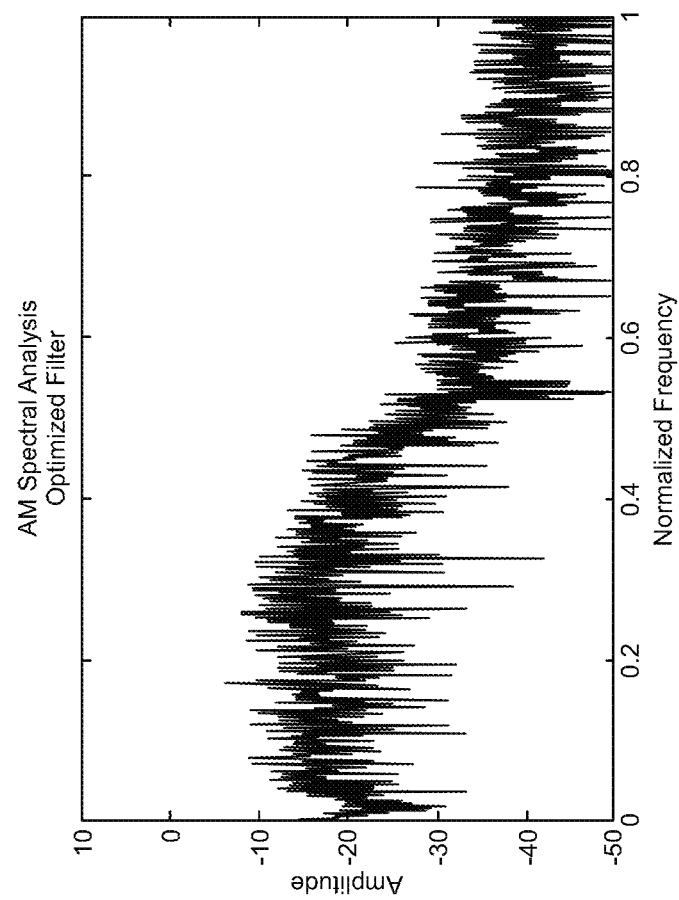

In FIGS. 29A and 29B, we can see the AM spectral analysis of the common truncated RRC pulse shape filter and the optimized pulse shape filter explained here. The message data $\{x_k\}$ are random QPSK symbols without the presence of additive gaussian noise.

The common RRC filter has strong rate-lines at the symbol rate (0.5 Normalized Frequency) and two times the symbol rate as evident in FIG. 28A. Using the optimized pulse shape filter (see FIG. 29B), the 1x and 2x symbol rate lines are completely suppressed and undetectable. The resulting optimized filter is more desirable for use in secure communication systems since it defeats this common and blind detection technique.

Figure 30A:
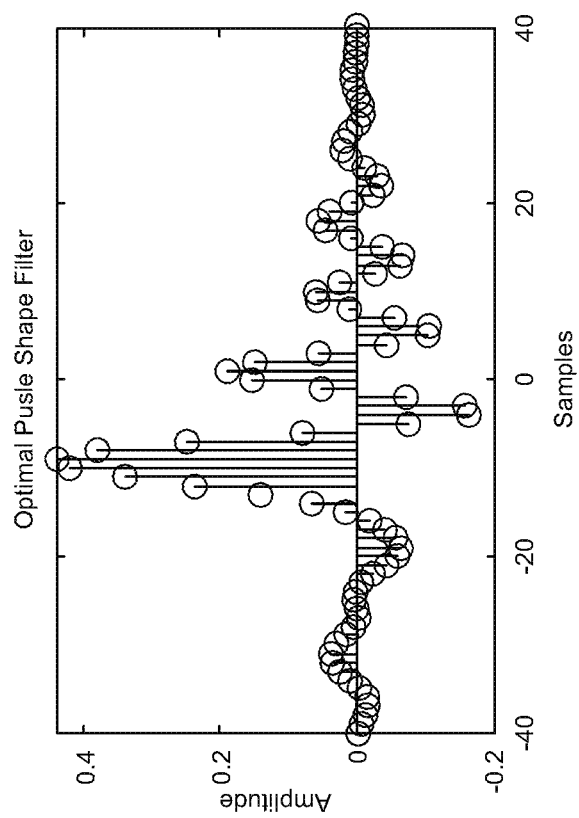
FIG. 30A depicts an exemplary embodiment of an optimal pulse shape filter for use in a transmitter according to still another aspect of the present invention.
Figure 30B:
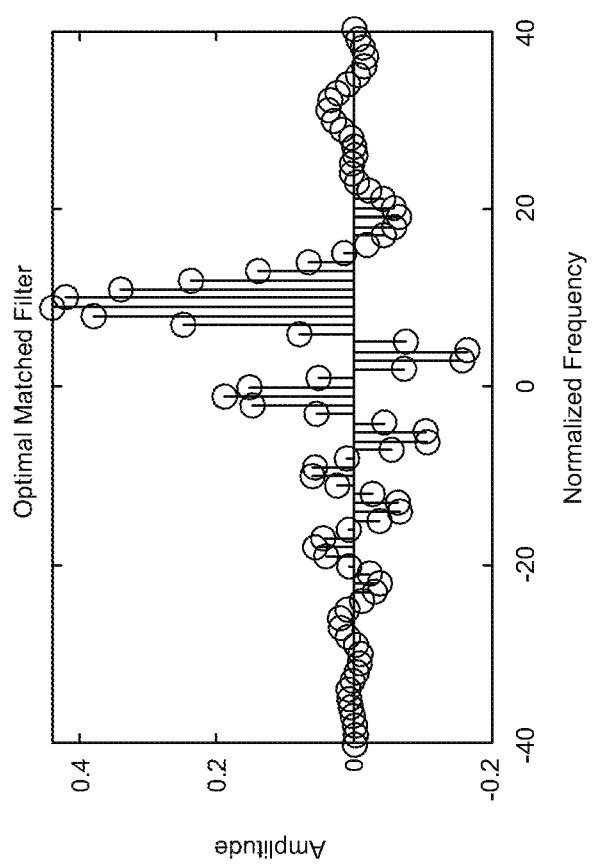
FIG. 30B depicts an exemplary embodiment of an optimal matched filter for use in a receiver that corresponds to the exemplary embodiment of the optimal pulse shape filter being used in the transmitter shown in FIG. 30A according to yet another aspect of the present invention.

Turning to FIG. 30A, shown therein is an optimal pulse shape filter and its corresponding matched filter (see FIG. 30B). First, the pulse shape filter is generated. The time reversed version of the pulse shape filter is then used at the receiver as the matched filter. The optimal matched filter is the time-reversed version of the transmitters pulse shape filter.

FIGS. 30A-B highlight the fact that that since the optimal pulse shape filter is asymmetrical, the resulting matched filter is different (i.e., it is time reversed). This is different than typical systems, in which the pulse shape filter is symmetrical, so the matched filter is identical. Thus, once the optimal pulse shape filter is generated, the necessary matched filter can be then generated as described above.

Conclusion

An artifact free LPI/LPD waveform (SPECTRIC_WF21A) is disclosed, along with a system design and a modeling of the key elements of the waveform to demonstrate the waveform's capability.

Disclosed was an in-depth evaluation of the waveform's resilience against a variety of blind and directed signal-search techniques. This analysis included traditional cyclostationary techniques along with a variety of other techniques. The present invention will have no detectable features at the intended operating powers.

What is claimed is:

1. An apparatus for communicating comprising:
    a) a spreader configured to generate a spread spectrum signal in which a transmitted power level is spread below a noise floor, said spread spectrum signal including a plurality of chips generated from a pseudorandom sequence and a plurality of mapped symbols;
    b) a chaotic scrambler configured to scramble the spread spectrum signal to generate a chaotic phase shifted spread spectrum signal by sequentially applying a plurality of chaotic phase shifts to the plurality of chips; and
    c) a pulse shape filter coupled to the chaotic scrambler and configured to filter the chaotic phase shifted spread spectrum signal to reduce one or more spectral analysis features in the chaotic phase shifted spread spectrum signal.

2. The apparatus according to claim 1, further comprising: a chaotic phase generator configured to generate the plurality of chaotic phase shifts.

3. The apparatus according to claim 1, further comprising: a long pseudorandom generator configured to generate the pseudorandom sequence.

4. The apparatus according to claim 1, further comprising: a symbol mapper configured to map a plurality of symbols to the plurality of mapped symbols.

5. The apparatus according to claim 4, further comprising: a burst multiplexer configured to output a fixed duration burst of the plurality of symbols at a predetermined rate.

6. The apparatus according to claim 5, further comprising: a forward error correction coder configured to receive a plurality of data bits and to output a plurality of encoded data bits to the burst multiplexer using a predetermined forward error correction code.

7. The apparatus according to claim 5, further comprising a receiver, wherein a plurality of pilot sequences is interspersed throughout the fixed duration burst and spaced in such a way that the receiver properly equalizes a received signal in a multipath environment by estimating and compensating for a channel multiple times during a demodulation process.

8. The apparatus according to claim 7, wherein the receiver extracts the plurality of pilot sequences for channel estimation by using two successive pilot sequences and interpolates and estimates the channel for inner symbols.

9. The apparatus according to claim 1, further comprising:
    a forward error correction coder configured to receive a plurality of data bits and to output a plurality of encoded data bits using a predetermined forward error correction code;
    a burst multiplexer including an input coupled to the forward error correction coder and configured to receive the plurality of encoded data bits, said burst multiplexer configured to output a fixed duration burst of a plurality of symbols at a predetermined rate from the plurality of encoded data bits; and
    a symbol mapper including an input configured to receive the fixed duration burst of the plurality of symbols from the burst multiplexer, said symbol mapper configured to map the plurality of symbols to the plurality of mapped symbols.

10. The apparatus according to claim 9, further comprising:
    a chaotic phase generator configured to generate the plurality of chaotic phase shifts; and
    a long pseudorandom generator configured to generate the pseudorandom sequence.

11. The apparatus according to claim 10, wherein said chaotic phase generator employs a tent logistical map to generate the plurality of chaotic phase shifts.

12. The apparatus according to claim 11, wherein the tent logistical map is defined as:

$$x_{n+1} = \begin{cases} \mu x_n, & \text{for } x < \frac{1}{2} \\ \mu(1 - x_n), & \text{for } x \geq \frac{1}{2} \end{cases}$$

where μ is a parameter between 0 and 2.

13. The apparatus according to claim 12, wherein fixed-point arithmetic is used to generate the plurality of chaotic phase shifts.

14. The apparatus according to claim 9, further comprising:
    an additional forward error correction coder configured to receive a plurality of meta data bits with information required by a receiver to detect, de-spread and decode the chaotic phase shifted spread spectrum signal and to output a plurality of encoded meta data bits to the burst multiplexer.

15. The apparatus according to claim 14, wherein said long pseudorandom generator also generates a common pseudorandom sequence to be shared by a plurality of receivers.

16. The apparatus according to claim 14, wherein said burst multiplexer has an additional input coupled to the additional forward error correction coder to receive the plurality of encoded meta data bits which are incorporated into the fixed duration burst.

17. The apparatus according to claim 1, wherein the pulse shape filter is optimized to reduce any amplitude modulation or frequency modulation spectral features in the chaotic phase shifted spread spectrum signal.

18. The apparatus according to claim 1, wherein the pulse shape filter is optimized by:
    a sequential quadratic programming algorithm, wherein a non-linear solver is set up to be constrained on attributes that define a root-Nyquist filter, including passband and stopband regions, and favorable inter-symbol interference measurements when accompanied by a matched filter; and providing the non-linear solver an objective function to minimize an amplitude modulated demodulation spectral rate line to create an asymmetrical root Nyquist filter.

19. A communications apparatus comprising:
a) a spreader configured to generate a spread spectrum signal in which a transmitted power level is spread below a noise floor, said spread spectrum signal including a plurality of chips generated from a pseudorandom sequence and a plurality of mapped symbols;
b) a chaotic scrambler configured to scramble the spread spectrum signal to generate a chaotic phase shifted spread spectrum signal by sequentially applying a plurality of chaotic phase shifts to the plurality of chips;
c) a pulse shape filter coupled to the chaotic scrambler and configured to filter the chaotic phase shifted spread spectrum signal to reduce one or more spectral analysis features in the chaotic phase shifted spread spectrum signal; and
d) a receiver configured to receive a baseband signal, said receiver including a matched filter that is time reversed relative to the pulse shape filter but which otherwise matches a shape of the pulse shape filter, said matched filter configured to filter the baseband signal.

20. The apparatus according to claim 19, the receiver further including a detector coupled to the matched filter and configured to detect a received burst in the baseband signal and establish timing, wherein said detector generates an acquisition sequence by combining the chaotic phase shifts with a long pseudorandom sequence and then using the acquisition sequence as a correlation template to detect the received burst and establish the timing.

21. The apparatus according to claim 20, the receiver further including:
a de-chaoser having a first input coupled to the detector to receive the acquisition sequence, having an output of a de-chaosed signal, and having a feedback input to receive a coarse frequency offset; and
a de-spreader having an input coupled to the de-chaoser, said de-spreader having a first output of a plurality of de-spread symbols and having a second output.

22. The apparatus according to claim 21, the receiver further including:
a coarse frequency estimator having an input coupled to the second output of the de-spreader and providing the coarse frequency offset to the de-chaoser via the feedback input, wherein the coarse frequency estimator estimates a frequency offset by looking at a spectral component of a signal after raising to a $4^{th}$ power and the de-chaoser uses the coarse frequency offset for frequency correction.

23. The apparatus according to claim 22, the receiver further including:
a burst demultiplexer having an input coupled to the first output of the de-spreader and having an output;
a fine frequency corrector having an input coupled to the output of the burst demultiplexer and having an output;
a phase corrector having an input coupled to the output of the fine frequency corrector and having an output, wherein a plurality of pilots embedded in the received burst are used as matched filters to ensure proper timing of a payload due to potential sample slips associated with clock drifts;
a demodulator having an input configured to receive a plurality of symbols from the output of the phase corrector and having an output, said demodulator configured to demodulate the plurality of symbols, wherein the demodulator outputs a plurality of soft decision bits;
an error correction decoder having an input coupled to the output of the demodulator, having an output, and error correcting the plurality of soft decision bits using a predetermined forward error correction code, wherein said error correction decoder comprises a turbo decoder; and
a cyclic redundancy check decoder having an input coupled to the output of the error correction decoder, said cyclic redundancy check decoder configured to verify a plurality of error corrected data bits for errors before outputting a plurality of data bits.

24. A method for transmitting covertly comprising:
generating, by a spreader, a spread spectrum signal at a transmit power level below a noise floor;
modulating, by a scrambler, a phase of each chip in the spread spectrum signal using a chaotic sequence to provide a chaotic phase shifted spread spectrum signal; and
filtering, by a pulse shaped filter, the chaotic phase shifted spread spectrum signal to depress blind detection features in an amplitude modulation and higher order power spectral densities.

25. The method according to claim 24, the modulating comprising using a M-ary phase shift keyed (PSK) modulation technique.

26. The method according to claim 24, the modulating comprising using an M-ary quadrature amplitude modulation (QAM) technique.

* * * * *